US012461459B2

(12) United States Patent
Nakamura et al.

(10) Patent No.: US 12,461,459 B2
(45) Date of Patent: Nov. 4, 2025

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Nobuhiro Nakamura, Shizuoka (JP); Shuntaro Watanabe, Kanagawa (JP); Kohei Makisumi, Shizuoka (JP); Hiroyuki Watanabe, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 608 days.

(21) Appl. No.: 17/937,509

(22) Filed: Oct. 3, 2022

(65) Prior Publication Data

US 2023/0124743 A1 Apr. 20, 2023

(30) Foreign Application Priority Data

Oct. 20, 2021 (JP) ................................ 2021-171759

(51) Int. Cl.
*G03G 5/147* (2006.01)
*G03G 21/18* (2006.01)

(52) U.S. Cl.
CPC ..... *G03G 5/14795* (2013.01); *G03G 5/14704* (2013.01); *G03G 5/1476* (2013.01); *G03G 21/1814* (2013.01)

(58) Field of Classification Search
CPC .. G03G 5/147; G03G 5/14708; G03G 5/1473; G03G 5/08278
See application file for complete search history.

(56) References Cited

U.S. PATENT DOCUMENTS

| | | | |
|---|---|---|---|
| 4,804,607 | A | 2/1989 | Atsumi |
| 8,455,170 | B2 | 6/2013 | Nakamura |
| 9,029,054 | B2 | 5/2015 | Okuda |
| 9,040,214 | B2 | 5/2015 | Fujii |
| 9,046,797 | B2 | 6/2015 | Fujii |
| 9,063,505 | B2 | 6/2015 | Sekiya |
| 9,069,267 | B2 | 6/2015 | Kaku |
| 9,256,145 | B2 | 2/2016 | Fujii |
| 9,304,416 | B2 | 4/2016 | Noguchi |

(Continued)

FOREIGN PATENT DOCUMENTS

| | | | |
|---|---|---|---|
| EP | 2 019 339 | A1 | 1/2009 |
| JP | 2010-250355 | A | 11/2010 |
| JP | 2018-128515 | A | 8/2018 |

OTHER PUBLICATIONS

Handbook of Chemistry, Basic Edition, 5th Ed., vol. II, Rev., Chem. Soc. of Jap., 642.

(Continued)

*Primary Examiner* — Peter L Vajda
(74) *Attorney, Agent, or Firm* — VENABLE LLP

(57) ABSTRACT

There is provided an electrophotographic photosensitive member comprising: a support, a photosensitive layer, and a surface layer in this order, wherein an outer surface of the electrophotographic photosensitive member exhibits a wrinkled shape by having a concavo-convex shape, the surface layer comprises a binder resin and an inorganic particle, and at least a part of the inorganic particle exposes at a concave portion of the concavo-convex shape.

8 Claims, 4 Drawing Sheets

(56) References Cited

U.S. PATENT DOCUMENTS

| | | | |
|---|---|---|---|
| 9,372,417 B2 | 6/2016 | Fujii | |
| 9,372,418 B2 | 6/2016 | Shida | |
| 9,372,419 B2 | 6/2016 | Tsuji | |
| 9,523,929 B2 | 12/2016 | Nakamura | |
| 9,535,346 B2 | 1/2017 | Sekiya | |
| 9,599,915 B2 | 3/2017 | Anezaki | |
| 9,599,917 B2 | 3/2017 | Okuda | |
| 9,726,992 B2 | 8/2017 | Sakuma | |
| 10,073,362 B2 | 9/2018 | Fujii | |
| 10,372,050 B2 | 8/2019 | Nishi | |
| 10,539,892 B2 | 1/2020 | Nishida | |
| 10,558,132 B2 | 2/2020 | Ishiduka | |
| 10,558,133 B2 | 2/2020 | Nakamura | |
| 10,642,177 B2 | 5/2020 | Nakamura | |
| 10,691,033 B2 | 6/2020 | Nishida | |
| 10,747,130 B2 | 8/2020 | Okuda | |
| 10,747,131 B2 | 8/2020 | Watanabe | |
| 10,831,117 B2 | 11/2020 | Sakakibara | |
| 10,831,118 B2 | 11/2020 | Watanabe | |
| 10,838,315 B2 | 11/2020 | Shimozawa | |
| 10,942,462 B2 | 3/2021 | Ito | |
| 11,003,102 B2 | 5/2021 | Ishiduka | |
| 11,112,719 B2 | 9/2021 | Makisumi | |
| 11,126,097 B2 | 9/2021 | Ishida | |
| 11,137,716 B2 | 10/2021 | Hiyama | |
| 11,150,566 B2 | 10/2021 | Iwasaki | |
| 11,181,837 B2 | 11/2021 | Sekiya | |
| 11,237,493 B2 | 2/2022 | Makisumi | |
| 11,249,407 B2 | 2/2022 | Watariguchi | |
| 11,256,186 B2 | 2/2022 | Shimozawa | |
| 11,340,553 B2 | 5/2022 | Watariguchi | |
| 11,366,402 B2 | 6/2022 | Ishiduka | |
| 11,392,050 B2 | 7/2022 | Nishida | |
| 11,392,074 B2 | 7/2022 | Ishida | |
| 2005/0069351 A1 | 3/2005 | Matsuo | |
| 2006/0068307 A1 | 3/2006 | Itami | |
| 2012/0100473 A1* | 4/2012 | Iwamoto | G03G 5/14704 399/159 |
| 2015/0185630 A1 | 7/2015 | Ito | |
| 2017/0299971 A1 | 10/2017 | Mori | |
| 2019/0332022 A1* | 10/2019 | Shimada | G03G 5/142 |
| 2020/0159135 A1 | 5/2020 | Ichihashi | |
| 2020/0257213 A1* | 8/2020 | Sakimura | G03G 5/14704 |
| 2021/0325793 A1 | 10/2021 | Nakamura | |
| 2021/0325794 A1 | 10/2021 | Iwasaki | |

OTHER PUBLICATIONS

U.S. Appl. No. 17/814,048, Kaname Watariguchi, Jul. 21 2022.
U.S. Appl. No. 17/815,276, Akihiro Maruyama, Jul. 27, 2022.
U.S. Appl. No. 17/816,024, Kenichi Kaku, Jul. 29, 2022.
U.S. Appl. No. 17/816,028, Kohei Makisumi, Jul. 29, 2022.
U.S. Appl. No. 17/936,088, Shuntaro Watanabe, Sep. 28, 2022.

* cited by examiner

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

Field of the Invention

The present invention relates to an electrophotographic photosensitive member, and a process cartridge and an electrophotographic apparatus each including the electrophotographic photosensitive member.

Description of the Related Art

An organic electrophotographic photosensitive member (hereinafter simply referred to as "an electrophotographic photosensitive member" or "a photosensitive member") containing an organic photoconductive substance (charge generating substance) has been used as an electrophotographic photosensitive member mounted in a process cartridge or an electrophotographic apparatus. Recently, an electrophotographic apparatus having a longer lifespan has been required. Accordingly, it is desired to provide an electrophotographic photosensitive member having an improved image quality and an improved abrasion resistance (mechanical durability).

Furthermore, in addition to the above-mentioned measures for the longer lifespan, it is required for the electrophotographic apparatus in recent years to increase efficiency of a transferring step for improving the image quality by suppressing the scattering of toner at the time of transfer and for reducing the amount of waste toner.

As a measure to improve the abrasion resistance of the electrophotographic photosensitive member, a technique to increase mechanical strength of the surface layer of the photosensitive member by preparing the surface layer as a cured layer using radically polymerized resin in the surface layer is proposed.

The electrophotographic photosensitive member is generally used in an electrophotographic image forming process including a charging step, an exposing step, a developing step, a transferring step, and a cleaning step. Of those, the cleaning step of removing residual toner on the electrophotographic photosensitive member after the transferring step is a step important in obtaining a clear image. As a method for the cleaning in the cleaning step, a method including bringing a rubbery cleaning blade into pressure contact with the electrophotographic photosensitive member to scrape off the toner is generally employed.

However, in the above cleaning method, since the frictional force between the cleaning blade and the electrophotographic photosensitive member is large, a chattering of the cleaning blade is generated and image defects caused by insufficient cleaning occur easily. The problem in the cleaning step becomes more remarkable as the mechanical strength of the surface layer of the electrophotographic photosensitive member becomes higher, that is, the circumferential surface of the electrophotographic photosensitive member is less likely to be worn. In other words, the problem becomes easier to occur when the surface layer of the electrophotographic photosensitive member is prepared as a cured layer to increase the mechanical strength of the surface layer as mentioned above.

Furthermore, the surface layer of the organic electrophotographic photosensitive member is generally formed by dip coating method in many cases, and the surface of the surface layer (that is, an outer surface of the electrophotographic photosensitive member) formed by the dip coating method becomes very smooth. As a result, a contact area between the cleaning blade and the circumferential surface of the electrophotographic photosensitive member becomes large, and an abrasion resistance between the cleaning blade and the circumferential surface of the electrophotographic photosensitive member increases, and the above problem become remarkable.

As a measure to overcome the above-mentioned problem, there has been proposed a method in which the contact area between the outer surface of the electrophotographic photosensitive member and the cleaning blade is made smaller by providing a concavo-convex shape on the outer surface of the photosensitive member, thereby lowering the friction force and improving cleanability.

Japanese Patent Application Laid-Open No. 2018-128515 describes a technique to employ a surface layer containing metal oxide fine particles. It is considered that in the case that the surface layer contains metal oxide fine particles, a part of the metal oxide fine particles exposes from the outer surface of the electrophotographic photosensitive member to form a concavo-convex shape, thereby lowering the friction force between the cleaning blade and the photosensitive member.

In addition, Japanese Patent Application Laid-Open No. 2010-250355 describes a technique regarding a photosensitive member having a groove shape along the circumferential direction of the circumferential surface of the photosensitive member. In the technique described in Japanese Patent Application Laid-Open No. 2010-250355, the contact area between the cleaning blade and the photosensitive member is decreased by providing the groove shape along the circumferential direction on the outer surface of the photosensitive member, thereby lowering the friction force.

In the technique described in Japanese Patent Application Laid-Open No. 2018-128515, the friction force between the cleaning blade and the photosensitive member is not lowered sufficiently, and the torque may increase when used in a low temperature and low humidity environment.

Furthermore, in the technique described in Japanese Patent Application Laid-Open No. 2010-250355, in a low temperature and low humidity environment, an insufficient cleaning in which toner partially slip through the groove shape portions may occur. In addition, in the technique described in Japanese Patent Application Laid-Open No. 2010-250355, there is a room to improve the transferability.

SUMMARY OF THE INVENTION

The present invention has been made in view of the above problems. That is, an object of the present invention is to provide an electrophotographic photosensitive member capable of, in the use under a low temperature and low humidity environment, reducing the friction force with the cleaning blade, exhibiting high cleanability, and having excellent transferability.

The above object is achieved by the present invention described below. That is, the electrophotographic photosensitive member according to the present invention is an electrophotographic photosensitive member comprising: a support, a photosensitive layer, and a surface layer in this order, wherein an outer surface of the electrophotographic photosensitive member exhibits a wrinkled shape by having a concavo-convex shape, when an observation region having square form with one side of 200 μm is provided at an arbitrary position on the outer surface, a line that passes through a central point of the observation region and is parallel to a circumferential direction of the electrophotographic photosensitive member is defined as a reference line L1, and 1,799 reference lines obtained by rotating the reference line L1 at every 0.1° around the central point are defined as reference lines L2 to L1,800, respectively, each of the reference lines L1 to L1,800 intersects with a ridgeline of a convex portion of the concavo-convex shape at a plurality of positions, and intersection angles between each of the reference lines L1 to L1,800 and the ridgelines at at least two positions selected from the plurality of positions have different values from each other, the surface layer comprises a binder resin and an inorganic particle, and at least a part of the inorganic particle exposes at a concave portion of the concavo-convex shape.

Further features of the present invention will become apparent from the following description of exemplary embodiments with reference to the attached drawings.

DESCRIPTION OF THE EMBODIMENTS

Figure 1A:
FIG. 1A is a top view for illustrating an example of a concavo-convex shape that an outer surface of an electrophotographic photosensitive member according to the present invention has.

Preferred embodiments of the present invention will now be described in detail in accordance with the accompanying drawings.

It is considered that in the technique described in Japanese Patent Application Laid-Open No. 2018-128515, the contact area between the photosensitive member and the cleaning blade cannot be reduced sufficiently and accordingly, there are cases in which the friction force is not sufficiently lowered in the use under a low temperature and low humidity environment, In addition, a toner and a photosensitive member are easy to be charged under the low temperature and low humidity environment and accordingly, an electrostatic adhesion force between the toner and the photosensitive member is easy to become high. In the technique described in Japanese Patent Application Laid-Open No. 2010-250355, the extending direction of the groove shape is parallel to the rotating direction of the photosensitive member. Therefore, as a result of studies conducted by the present inventors, it is found that especially under the low humidity and low temperature environment, there are cases in which a residual toner on the outer surface of the photosensitive member pass through a contacting portion between the photosensitive member and the cleaning blade via the groove shape, and accordingly, streaky image defects are caused. Particularly, in recent years, in order to meet with a demand for high definition and high-quality images, a spherical toner with small particle diameter has become major. The spherical toner with small particle diameter has a high adhesion force onto the outer surface of the photosensitive member, and therefore, removal of the toner by the cleaning blade is easy to become insufficient. As a result, in the case that the spherical toner with small particle diameter is used, in the technique described in Japanese Patent Application Laid-Open No. 2010-250355, it is considered that the streaky image defects are caused more easily.

Furthermore, under the low humidity and low temperature environment, adhesion force between the toner and the photosensitive member is easy to become high as mentioned above, and therefore, an amount of residual toner on the outer surface of the photosensitive member tends to become large. In order to improve the transferability, adhesive property between the toner and the electrophotographic photosensitive member is necessary to be lowered, and it is effective to reduce a contact area between the toner and the electrophotographic photosensitive member. Accordingly, it is considered to reduce the contact are between the toner and the electrophotographic photosensitive member by means of providing a concavo-convex shape on the outer surface of the photosensitive member. However, the concavo-convex shape disclosed in Japanese Patent Application Laid-Open No. 2010-250355 was found to be insufficient for improving the transferability.

As a result of an intensive study, the present inventors have found that the above problems can be solved by providing a predetermined concavo-convex shape described in the following and further by exposing an inorganic particle at a concave portion of the concavo-convex shape.

Specifically, the electrophotographic photosensitive member according to the present invention is an electrophotographic photosensitive member comprising: a support, a photosensitive layer, and a surface layer in this order, wherein an outer surface of the electrophotographic photosensitive member exhibits a wrinkled shape by having a concavo-convex shape, when an observation region having square form with one side of 200 μm is provided at an arbitrary position on the outer surface, a line that passes through a central point of the observation region and is parallel to a circumferential direction of the electrophotographic photosensitive member is defined as a reference line L1, and 1,799 reference lines obtained by rotating the reference line L1 at every 0.1° around the central point are defined as reference lines L2 to L1,800, respectively, each of the reference lines L1 to L1,800 intersects with a ridgeline of a convex portion of the concavo-convex shape at a plurality of positions, and intersection angles between each of the reference lines L1 to L1,800 and the ridgelines at at least two positions selected from the plurality of positions have different values from each other, the surface layer comprises a binder resin and an inorganic particle, and at least a part of the inorganic particle exposes at a concave portion of the concavo-convex shape.

With respect to the mechanism for the problems in the prior arts as described above to be solved by the electrophotographic photosensitive member according to the present invention having above-mentioned constitution, though it is not clarified, the present inventers suppose as follows.

First, a contact area at the time of for the cleaning blade contacting the electrophotographic photosensitive member is reduced sufficiently by the outer surface of the electrophotographic photosensitive member having a predetermined number or more of convex portions within a certain area. Accordingly, it is supposed that the friction force between the cleaning blade and the electrophotographic photosensitive member is reduced sufficiently even under the low humidity and low temperature environment. Moreover, the outer surface of the electrophotographic photosensitive member exhibits a wrinkled shape by having the concavo-convex shape and the ridgelines of the convex portions of the concavo-convex shape extend towards various directions, and therefore, it is considered that the passing-through of the toner via the concave portions of the concavo-convex shape at the time of the rotation of the electrophotographic photosensitive member is also suppressed. It is considered that as a result of above, both the reduction of the friction force and the suppression of the passing-through of the toner could be achieved simultaneously at high level.

In the next, the reason for the electrophotographic photosensitive member according to the present invention to have an excellent transferability is explained. According to study by the present inventors, in the case that the outer surface of the electrophotographic photosensitive member only has the above concavo-convex portion and no inorganic particle exposes at the concave portion of the concavo-convex shape, the effect on improving the transferability is limited. The reason thereof is considered as that because the toner is pushed into the concave portion of the concavo-convex shape and the adhesion force between the toner and the surface of the photosensitive member become strong. Then, as a result of further study, the present inventors has found that when a surface layer of the photosensitive member contains an inorganic particle and the inorganic particle exposes at the concave portion of the concavo-convex shape, an excellent transferability can be obtained. It is supposed that it is because the toner and the surface of the photosensitive member are apart a distance from each other to produce a gap by the inorganic particle exposed at the concave portion of the concavo-convex shape and the toner making a point contact, and accordingly the adhesion force between the toner and the surface of the photosensitive member is lowered.

The concavo-convex shape that the outer surface of the electrophotographic photosensitive member according to the present invention has and the inorganic particle that the surface layer of the electrophotographic photosensitive member according to the present invention contains are described more specifically in the following.

The concavo-convex shape present at the outer surface of the electrophotographic photosensitive member according to the present invention has a certain level or more of fineness, and has a certain number or more of convex portions in a certain area. Specifically to say, first, on the outer surface of the electrophotographic photosensitive member, observation regions each having square form with one side of 200 μm and including, as their respective central points, 76 points of intersection of 19 line segments dividing the electrophotographic photosensitive member into 20 equal parts in its axial direction and 4 line segments dividing the photosensitive member into 4 equal parts in its circumferential direction are placed so that one side of the square observation region is parallel to the circumferential direction of the photosensitive member. Then, with respect to each of the observation regions, a line that passes through the central point of the observation region and is parallel to the circumferential direction of the electrophotographic photosensitive member is defined as a reference line L1. In addition, 1,799 reference lines obtained by rotating the reference line L1 at every 0.1° around the central point are defined as reference lines L2 to L1,800, respectively. In this instance, the concavo-convex shape in the respective observation region includes enough number of convex portions to intersect with each of the reference lines L1 to L1,800 at a plurality of positions.

In addition, the concavo-convex shape on the outer surface of the electrophotographic photosensitive member according to the present invention has a complex shape and the ridgelines of the convex portions extend toward various directions. Specifically to say, with respect to each of the reference lines L1 to L1,800, at least two positions selected from the plurality of positions at which the reference line intersect with the convex portion of the concavo-convex shape have different intersection angles from each other. Accordingly, the outer surface of the electrophotographic photosensitive member according to the present invention exhibits a wrinkled shape.

Figure 1B:
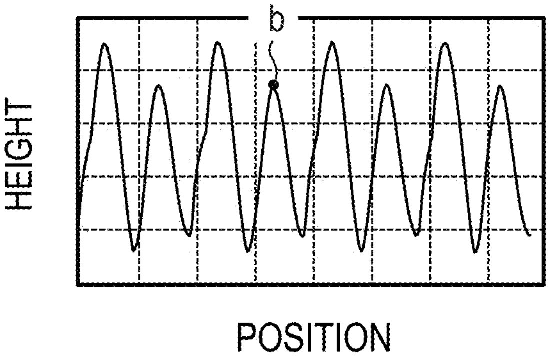
FIG. 1B is an example of a graph for showing height information obtained by observing the outer surface of the electrophotographic photosensitive member according to the present invention.

FIGS. 1A and 1B are views for illustrating an example of a concavo-convex shape that the outer surface of the electrophotographic photosensitive member according to the present invention has. FIG. 1A is a top view of the outer surface of the electrophotographic photosensitive member, and FIG. 1B is a graph for showing height information obtained by observing the outer surface of the electrophotographic photosensitive member.

As illustrated in FIG. 1A, the concavo-convex shape on the outer surface of the electrophotographic photosensitive member according to the present invention has striped concavo-convex shapes that can be observed on the outer surface of the electrophotographic photosensitive member. The striped shapes are not distributed in one direction, but are composed of a curved part, a discontinuous part, and a branched part, and a plurality of striped shapes are present in the square observation region with one side of 200 μm.

In addition, the ridgeline of the convex portions of the concavo-convex shape refers to a straight line or a curve obtained by connecting the highest points of the convex portions separating adjacent concave portions in the stripped concavo-convex shapes when the outer surface of the electrophotographic photosensitive member is observed from above, as indicated by reference symbol a in FIG. 1A.

A method of specifying the convex portions by observing the outer surface of the electrophotographic photosensitive member to obtain the ridgelines is not particularly limited, but the ridgelines can be specified, for example, by image analysis of the height information obtained by measuring the outer surface of the electrophotographic photosensitive member using a confocal laser scanning microscope. An example of plotting the height information obtained by the method against a position on a straight line placed on the outer surface of the electrophotographic photosensitive member is illustrated in FIG. 1B. The ridgeline of the curved line as indicated by the reference symbol a in FIG. 1A can be obtained by specifying the apexes of the convex shapes indicated by a reference symbol b in FIG. 1B.

In addition, in the present invention, the ridgelines of the convex portions of the concavo-convex shape have a plurality of curvatures in the ridgelines. The curvature is the amount representing a degree of bending of a curved line, and when a neighborhood of an arbitrary point on the curved line is approximated by a circle, a curvature $\chi$ is obtained as a reciprocal of a radius R of the circle as shown in Equation (I), $$\chi(s) = \frac{1}{R(s)} = \left|\frac{d^2 r}{ds^2}\right| \tag{I}$$

where s represents a length of a portion corresponding to a circular arc of the curved line, and r is a position vector of the arbitrary point on the curved line.

It is preferable that the electrophotographic photosensitive member according to the present invention satisfies the following conditions. That is, when a two-dimensional power spectrum F(r,θ) with a frequency component as r and an angle component as θ is obtained by performing frequency analysis of the height information of the concavo-convex shape in the observation region provided on the outer surface of the photosensitive member, a one-dimensional radial direction distribution function p(r) obtained by integrating the two-dimensional power spectrum F(r,θ) in a θ direction has at least one maximum value, and when an angular distribution q(θ) is calculated from the two-dimensional power spectrum F(r,θ) at a frequency rp at which the one-dimensional radial direction distribution function p(r) has the maximum value, a variation in power values in the entire θ range is 15% or less.

As a result of study by the present inventors, it was found that when the outer surface of the electrophotographic photosensitive member has a concavo-convex shape and the concavo-convex shape has a predetermined periodicity as illustrated in FIG. 1A, the effect of the present invention can be highly obtained.

As a method for obtaining the periodicity of the concavo-convex shape is not particularly limited, but it is possible to use a method of acquiring height information by observing the outer surface of the electrophotographic photosensitive member and then analyzing the obtained results by using two-dimensional Fourier transform.

Specifically, in a case where the height information of the concavo-convex shape is obtained with the number of data $N_1 \times N_2$, when a height at an arbitrary point (n, m) in the in-plane is $h_{n,m}$, a two-dimensional power spectrum P(k,l) obtained by discrete Fourier transform is expressed by the following Equation (II).

$$P_{k,l} = \frac{1}{N_1 \cdot N_2}|f_{k,l}|^2 \tag{II}$$

Here, $f_{k,l}$ is expressed by the following Equation (III).

$$f_{k,l} = \sum_{n=0}^{N_1-1}\sum_{m=0}^{N_2-1} h_{n,m} e^{-ikn} e^{-ilm} \tag{III}$$

where k and l represent a frequency in a horizontal direction and a frequency in a vertical direction, respectively.

Further, a spectrum obtained by converting the two-dimensional power spectrum P(k,l) obtained by Equation (II) from an orthogonal coordinate system (k,l) into a polar coordinate system (r,θ) is represented by the two-dimensional power spectrum F(r,θ). Here, r and θ satisfy the following Equation (IV) and Equation (V), respectively.

$$r=\sqrt{k^2+l^2} \tag{IV}$$

$$\theta=\tan^{-1}(l/k) \tag{V}$$

In the present invention, the height information obtained by being measured at a regular interval of 0.25 μm or less in each of two directions parallel to each side of the square in the square observation region with one side of 200 μm is used for the analysis.

Figure 2A:
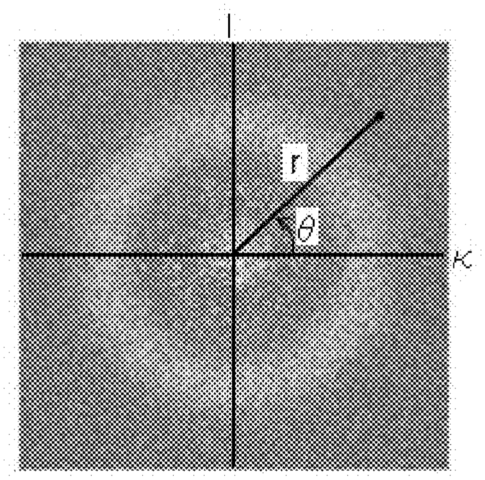
FIG. 2A is a view for illustrating a two-dimensional power spectrum $F(r,\theta)$ obtained by analyzing a frequency with respect to wrinkles on the outer surface that the electrophotographic photosensitive member according to the present invention has.
Figure 2B:
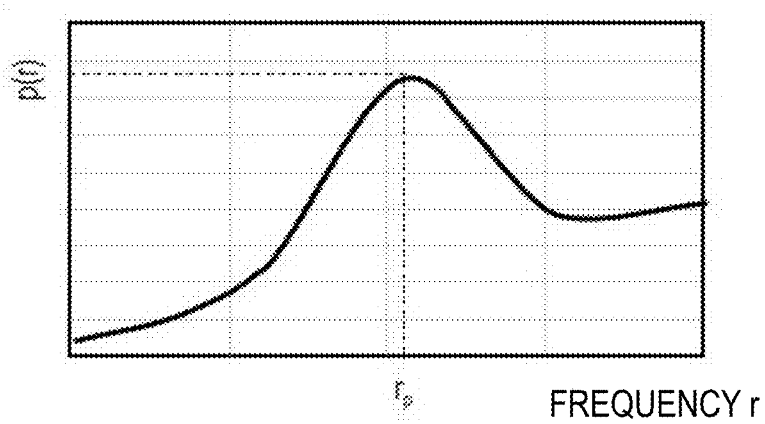
FIG. 2B is a view for illustrating a one-dimensional radial direction distribution function obtained by integrating, in a $\theta$ direction, the two-dimensional power spectrum $F(r,\theta)$ obtained by analyzing the frequency with respect to wrinkles on the outer surface that the electrophotographic photosensitive member according to the present invention has.
Figure 2C:
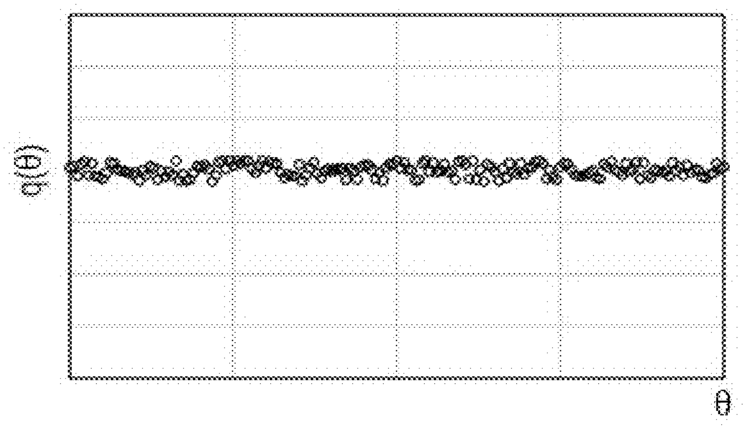
FIG. 2C is a view for illustrating a variation in power values in the entire $\theta$ range when an angular distribution $q(\theta)$ is calculated from the two-dimensional power spectrum $F(r,\theta)$ at a frequency rp at which the one-dimensional radial direction distribution function $p(r)$ illustrated in FIG. 2B has a maximum value.

FIGS. 2A to 2C are views for illustrating an example of the result obtained by numerical analysis of the electrophotographic photosensitive member according to the present invention. FIG. 2A is a view for illustrating the two-dimensional power spectrum F(r,θ) obtained by analyzing the frequency with respect to the concavo-convex shape that the outer surface of the electrophotographic photosensitive member has. In addition, FIG. 2B is a view for illustrating the one-dimensional radial direction distribution function obtained by integrating the obtained two-dimensional power spectrum F(r,θ) in the θ direction. In addition, FIG. 2C is a view for illustrating the variation in power values in the entire θ range when the angular distribution q(θ) is calculated from the two-dimensional power spectrum F(r,θ) at the frequency rp at which the one-dimensional radial direction distribution function p(r) has the maximum value.

As illustrated in FIG. 2B, in the electrophotographic photosensitive member according to the present invention, the radial direction distribution function p(r) obtained by converting the two-dimensional power spectrum F(r,θ) to one-dimensional in the radial direction has at least one maximum value. This means that concave portions and convex portions that the outer surface of the electrophotographic photosensitive member has are distributed at regular intervals.

In addition, as illustrated in FIG. 2C, when the angular distribution q(θ) of F(rp,θ) is calculated at the frequency rp at which the radial direction distribution function p(r) has a maximum value, the variation in power values in the entire θ range is preferably 15% or less. Accordingly, the passing-through of the toner is suppressed effectively. This means that when the variation in power values is low, the ridgelines of the convex portions of the concavo-convex shape extend toward various directions and the concavo-convex shape is uniform in every direction.

The frequency rp at which the radial direction distribution function p(r) has the maximum value is preferably in a range of 0.05 to 0.17 $\mu m^{-1}$. Accordingly, the passing-through of the toner can be suppressed effectively and excellent transferability can be obtained. When the frequency rp is 0.05 $\mu m^{-1}$ or more, the contact area between the outer surface of the photosensitive member and the cleaning blade is reduced and the effect of reducing the friction force between the outer surface of the photosensitive member and the cleaning blade can be highly obtained. When the frequency rp is 0.17 $\mu m^{-1}$ or less, the inorganic particle exposed from the concave portion and the toner become easy to make a point contact with each other.

The concavo-convex shape preferably has a depth of 1.0 μm or less. Accordingly, the inorganic particle easily makes a point contact with the toner. More preferably, the concavo-convex shape has a depth of 0.1 to 1.0 μm. When the concavo-convex shape has a depth of 0.1 μm or more, the effect of reducing the friction force between the outer surface of the photosensitive member and the cleaning blade can be highly obtained. A method for measuring the depth of the concavo-convex shape will be described later.

Figure 3:
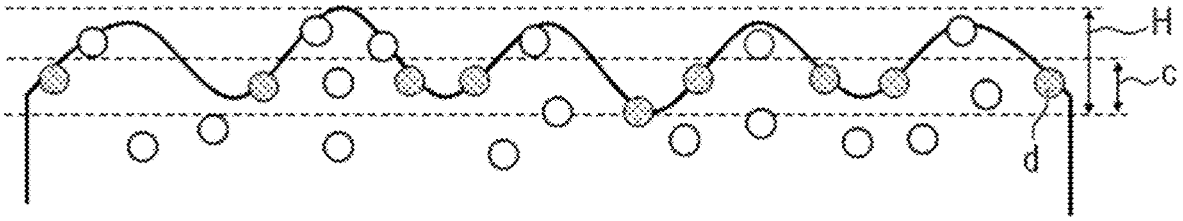
FIG. 3 is a schematic diagram for illustrating a cross section of the outer surface of the electrophotographic photosensitive member.

As illustrated in FIG. 3, the electrophotographic photosensitive member according to the present invention comprise an inorganic particle in a surface layer, and a part among all the inorganic particles in the surface layer corresponds to the inorganic particle d which partially exposes from a concave portion c of the concavo-convex shape formed on the outer surface of the electrophotographic photosensitive member. The inorganic particle has low elasticity and is advantageous since at the time of contacting with the toner, the contact area between the surface of the toner and the surface of the particle can be made smaller.

Examples of the inorganic particle contained in the surface layer can include the particles of such as magnesium oxide, zinc oxide, lead oxide, tin oxide, tantalum oxide, indium oxide, bismuth oxide, yttrium oxide, cobalt oxide, copper oxide, manganese oxide, selenium oxide, iron oxide, zirconium oxide, germanium oxide, tin oxide, titanium oxide, niobium oxide, molybdenum oxide, vanadium oxide, copper aluminum oxide, tin oxide doped with antimony ions, and hydrotalcite. These particles may be used alone or two or more kinds thereof may be combined and used. As the inorganic particle, a silica particle can be preferably used.

As the silica particle, commonly known silica particles can be used and either a particle of dry silica or wet silica may be used. Preferably, the silica particle is a particle of wet silica obtained by the sol-gel process (hereinafter, also referred to as "sol-gel silica").

The sol-gel silica may be a particle of which surface is hydrophilic or a particle of which surface has been treated and hydrophobized. Preferably, the sol-gel silica is the particle of which surface has been treated and hydrophobized. By the hydrophobization treatment to the surface of the silica particle, the silica particle become easy to be dispersed in the surface layer and become easy to be made to expose from the surface of the surface layer.

Examples of a method for the hydrophobization treatment, in the sol-gel process, can include a method in which a solvent is removed from a sol-gel dispersion liquid, the sol-gel dispersion is dried, and thereafter, a treatment with a hydrophobization treatment agent is applied; and a method in which a hydrophobization treatment agent is directly added to a sol-gel dispersion liquid and a treatment at the same time as drying is applied. From the viewpoint of a control of a half-value width of a particle size distribution and a control of a saturated water adsorption amount, the method in which the hydrophobization treatment agent is directly added to the sol-gel dispersion liquid is preferable.

Examples of the hydrophobization treatment agent can include followings. Chlorosilanes such as methyltrichlorosilane, dimethyldichlorosilane, trimethylchlorosilane, phenyltrichlorosilane, diphenyldichlorosilane, t-butyldimethylchlorosilane, and vinyltrichlorosilane; alkoxysilanes such as tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, isobutyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, isobutyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, and γ-(2-aminoethyl)aminopropyldimethoxysilane; silazanes such as hexamethyldisilazane, hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, dimethyltetravinyldisilazane; silicone oils such as dimethyl silicone oil, methyl hydrogen silicone oil, methylphenyl silicone oil, alkyl-modified silicone oil, chloroalkyl-modified silicone oil, chlorophenyl-modified silicone oil, fatty acid-modified silicone oil, polyether-modified silicone oil, alkoxy-modified silicone oil, carbinol-modified silicone oil, amino-modified silicone oil, fluorine-modified silicone oil, and terminal reactive silicone oil; siloxanes such as hexamethylcyclotrisiloxane, octamethylcyclotetrasiloxane, decamethylcyclopentasiloxane, hexamethyldisiloxane and octamethyltrisiloxane; and as fatty acids and metal salts thereof, long-chain fatty acids such as undecylic acid, lauric acid, tridecylic acid, dodecylic acid, myristic acid, palmitic acid, pentadecylic acid, stearic acid, heptadecylic acid, arachidic acid, montanic acid, oleic acid, linoleic acid, and arachidonic acid, and salts of said fatty acids with metals such as zinc, iron, magnesium, aluminum, calcium, sodium and lithium.

Among these, alkoxysilanes, silazanes, and silicone oils are preferably used because they are easily applied with the hydrophobization treatment. The hydrophobization treatment agents may be used alone or with two or more kinds thereof may be combined and used.

The volume-average particle diameter of the inorganic particle is preferably 50 to 550 nm. When the inorganic particle having said volume-average particle diameter is used, it is easy to expose the inorganic particle partially at the concave portion of the concavo-convex shape of the surface layer and additionally, it is easy to make the contact area with the toner smaller since the curvature of the surface of the inorganic particle is high.

Figure 4:
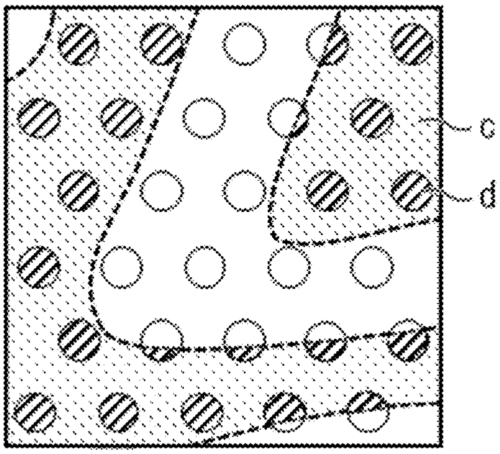
FIG. 4 is a schematic diagram for illustrating an exposure of inorganic particles that is observed when the outer surface of the electrophotographic photosensitive member is viewed from above.

When an outer surface of the electrophotographic photosensitive member according to the present invention is observed from above at the predetermined magnification of the scanning electron microscope, as illustrated in FIG. 4, the inorganic particle d exposed from the convex portion c of the concavo-convex shape can be observed. In this instance, when a total area of an exposed portion of the inorganic particle at the concave portion is defined as S1, and a total area of the concave portion except for a portion in which the inorganic particle exposes is defined as S2, S1/(S1+S2) (hereinafter, also referred to as "coverage ratio") is preferably 0.20 to 0.80.

When the coverage ratio is 0.20 or more, a contact area where toner and a portion of the outer surface of the photosensitive member at which the inorganic particle is not exposed can be made smaller, and the effect of lowering the adhesion ability of the toner to improve the transferability of the photosensitive member can be highly obtained. An extremely high ratio of the inorganic particle exposed from the concave portion make the distance between the portions where the toner and the inorganic particle contact with each other closer, resulting in the increase of the contact area between the toner and the inorganic particle exposed from the outer surface of the photosensitive member. When the coverage ratio is 0.80 or less, the distance between the portions where the toner and the inorganic particle contact with each other can be secured appropriately, and the effect of improving the transferability of the photosensitive member can be highly obtained. The coverage ratio is more preferably 0.25 to 0.60.

Hereinafter, the configuration of the electrophotographic photosensitive member according to the present invention is described.

[Electrophotographic Photosensitive Member]

The electrophotographic photosensitive member according to the present invention includes a support, a photosensitive layer, and a surface layer in this order. The electrophotographic photosensitive member according to the present invention may further include an electroconductive layer and an undercoat layer between the support and the photosensitive layer.

An example of a method of producing an electrophotographic photosensitive member can include a method in which coating liquids for respective layers are prepared and applied on the support in a desired order and the coating liquids are dried. In this case, examples of a method of applying the coating liquid can include dip coating, spray coating, ink jet coating, roll coating, die coating, blade coating, curtain coating, wire bar coating, and ring coating. Among them, dip coating is preferred from the viewpoints of efficiency and productivity.

Hereinafter, the support and the respective layers will be described.

<Support>

In the present invention, the electrophotographic photosensitive member includes a support. The support is preferably a support having electroconductivity (an electroconductive support). In addition, examples of a shape of the support can include such as a cylindrical shape, a belt shape, and a sheet shape. Among them, the cylindrical shape is preferable. In addition, a surface of the support may be subjected to an electrochemical treatment such as anodization, a blast treatment, or a cutting treatment.

As a material for the support, a metal, a resin, and glass are preferred.

Examples of the metal can include aluminum, iron, nickel, copper, gold, and stainless steel, or alloys thereof. Among them, an aluminum support obtained by using aluminum is preferred.

In addition, electroconductivity may be imparted to the resin or glass through a treatment such as mixing or coating with an electroconductive material.

<Electroconductive Layer>

In the present invention, an electroconductive layer may be provided on the support. By providing the electroconductive layer, scratches or unevenness on the surface of the support can be concealed, or reflection of light on the surface of the support can be controlled.

The electroconductive layer preferably contains electroconductive particles and a resin.

Examples of a material for the electroconductive particle can include a metal oxide, a metal, and carbon black.

Examples of the metal oxide can include zinc oxide, aluminum oxide, indium oxide, silicon oxide, zirconium oxide, tin oxide, titanium oxide, magnesium oxide, antimony oxide, and bismuth oxide. Examples of the metal can include aluminum, nickel, iron, nichrome, copper, zinc, and silver.

Among them, the metal oxide is preferably used for the electroconductive particle. In particular, titanium oxide, tin oxide, or zinc oxide is more preferably used for the electroconductive particle.

In a case where the metal oxide is used for the electroconductive particle, a surface of the metal oxide may be treated with a silane coupling agent or the like, or the metal oxide may be doped with an element such as phosphorus or aluminum, or an oxide thereof.

In addition, the electroconductive particle may have a laminate structure having a core particle and a coating layer that coats the core particle. Examples of a material for the core particle can include titanium oxide, barium sulfate, and zinc oxide. An example of a material for the coating layer can include a metal oxide such as tin oxide.

In addition, in a case where the metal oxide is used for the electroconductive particle, a volume-average particle diameter of the electroconductive particles is preferably 1 to 500 nm, and more preferably 3 to 400 nm.

Examples of the resin can include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain a masking agent such as silicone oil, resin particles, or titanium oxide.

A film thickness of the electroconductive layer is preferably 1 to 50 μm, and particularly preferably 3 to 40 μm.

The electroconductive layer can be formed by preparing a coating liquid for an electroconductive layer containing the above-described respective materials and a solvent, forming a coating film thereof, and drying the coating film. Examples of the solvent used in the coating liquid can include an alcohol-based solvent, a sulfoxide-based solvent, a ketone-based solvent, an ether-based solvent, an ester-based solvent, and an aromatic hydrocarbon-based solvent. Examples of a method for dispersing the electroconductive particles in the coating liquid for an electroconductive layer can include methods using a paint shaker, a sand mill, a ball mill, and a liquid collision-type high-speed disperser.

<Undercoat Layer>

In the present invention, an undercoat layer may be provided on the support or the electroconductive layer. By providing the undercoat layer, an adhesive function between layers can be increased to impart a charge injection inhibiting function.

The undercoat layer preferably contains a resin. In addition, the undercoat layer may be formed as a cured film by polymerization of a composition containing a monomer having a polymerizable functional group.

Examples of the resin can include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamide acid resin, a polyimide resin, a polyamide imide resin, and a cellulose resin.

Examples of the polymerizable functional group included in the monomer having the polymerizable functional group can include an isocyanate group, a block isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In addition, the undercoat layer may further contain an electron transporting substance, a metal oxide, a metal, an electroconductive polymer, and the like, in order to improve electric characteristics. Among them, an electron transporting substance or a metal oxide is preferably used.

Examples of the electron transporting substance can include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron transporting substance having a polymerizable functional group may be used as the electron transporting substance and copolymerized with the above-described monomer having the polymerizable functional group to form an undercoat layer as a cured film.

Examples of the metal oxide can include indium tin oxide, tin oxide, indium oxide, titanium oxide, zinc oxide, aluminum oxide, and silicon dioxide. Examples of the metal can include gold, silver, and aluminum.

In addition, the undercoat layer may further contain an additive.

A film thickness of the undercoat layer is preferably 0.1 to 50 μm, more preferably 0.2 to 40 μm, and particularly preferably 0.3 to 30 μm.

The undercoat layer can be formed by preparing a coating liquid for an undercoat layer containing the above-described respective materials and a solvent, forming a coating film thereof, and drying and/or curing the coating film. Examples of the solvent used in the coating liquid can include an alcohol-based solvent, a ketone-based solvent, an ether-based solvent, an ester-based solvent, and an aromatic hydrocarbon-based solvent.

<Photosensitive Layer>

The photosensitive layer of the electrophotographic photosensitive member is mainly classified into (1) a laminate type photosensitive layer and (2) a monolayer type photosensitive layer. (1) The laminate type photosensitive layer includes a charge generation layer containing a charge generating substance and a charge transport layer containing a charge transporting substance. (2) The monolayer type photosensitive layer includes a photosensitive layer containing both a charge generating substance and a charge transporting substance. The electrophotographic photosensitive member according to the present invention preferably include the laminate type photosensitive layer.

(1) Laminate Type Photosensitive Layer

The laminate type photosensitive layer includes a charge generation layer and a charge transport layer.

(1-1) Charge Generation Layer

The charge generation layer preferably contains a charge generating substance and a resin.

Examples of the charge generating substance can include an azo pigment, a perylene pigment, a polycyclic quinone pigment, an indigo pigment, and a phthalocyanine pigment. Among them, an azo pigment and a phthalocyanine pigment are preferred. Among the phthalocyanine pigments, an oxytitanium phthalocyanine pigment, a chlorogallium phthalocyanine pigment, and a hydroxygallium phthalocyanine pigment are preferred.

A content of the charge generating substance in the charge generation layer is preferably 40 to 85% by mass, and more preferably 60 to 80% by mass, with respect to a total mass of the charge generation layer.

Examples of the resin can include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Among them, a polyvinyl butyral resin is more preferred.

In addition, the charge generation layer may further contain an additive such as an antioxidant or an ultraviolet absorber. Specific examples thereof can include a hindered phenol compound, a hindered amine compound, a sulfur compound, a phosphorus compound, and a benzophenone compound.

A film thickness of the charge generation layer is preferably 0.1 to 1 μm, and more preferably 0.15 to 0.4 μm.

The charge generation layer can be formed by preparing a coating liquid for a charge generation layer containing the above-described respective materials and a solvent, forming a coating film thereof, and drying the coating film. Examples of the solvent used in the coating liquid can include an alcohol-based solvent, a sulfoxide-based solvent, a ketone-based solvent, an ether-based solvent, an ester-based solvent, and an aromatic hydrocarbon-based solvent.

(1-2) Charge Transport Layer

The charge transport layer preferably contains a charge transporting substance and a resin.

Examples of the charge transporting substance can include a polycyclic aromatic compound, a heterocyclic compound, a hydrazone compound, a styryl compound, an enamine compound, a benzidine compound, a triarylamine compound, and a resin having a group derived from these substances. Among them, a triarylamine compound or a benzidine compound is preferably used, and a compound represented by the following Formula (1) is appropriately used.

(1)

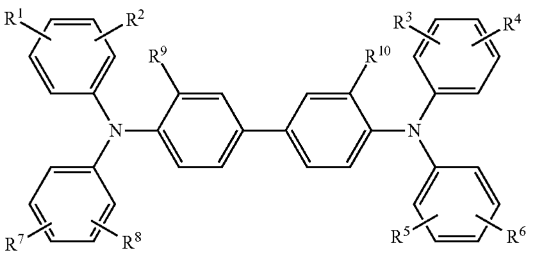

where, in the Formula (1), $R^1$ to $R^{10}$ each independently represent a hydrogen atom or a methyl group.

Examples of a structure represented by Formula (1) are shown in Formula (1-1) to Formula (1-10). Among them, compounds having the structures represented by Formula (1-1) to Formula (1-6) are more preferred.

(1-1)
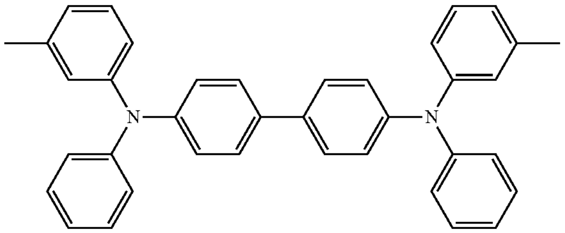
(1-2)
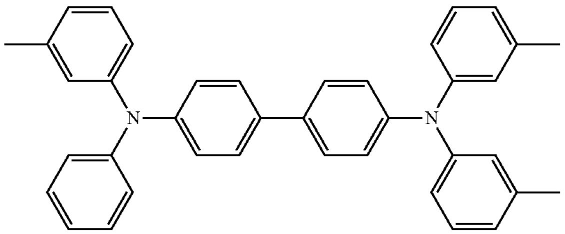
(1-3)
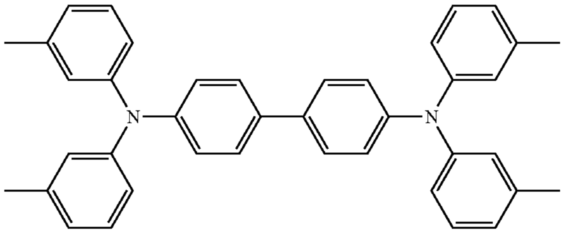
(1-4)
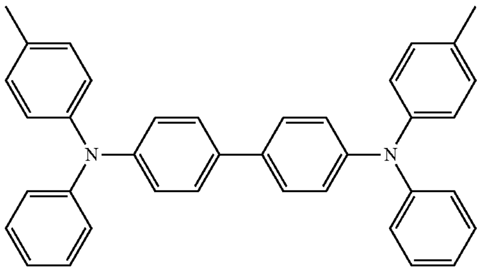
(1-5)
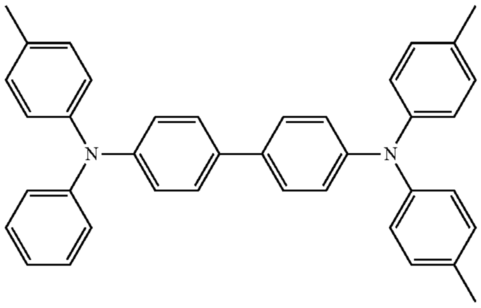
-continued
(1-6)
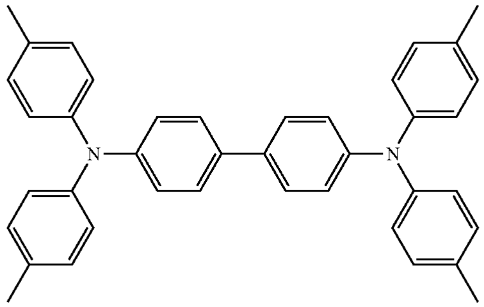
(1-7)
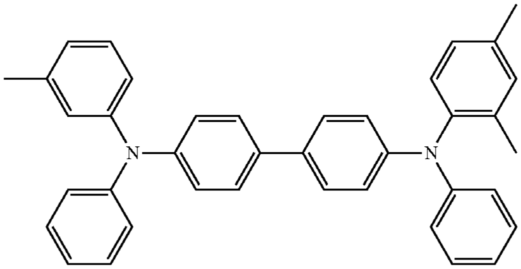
(1-8)
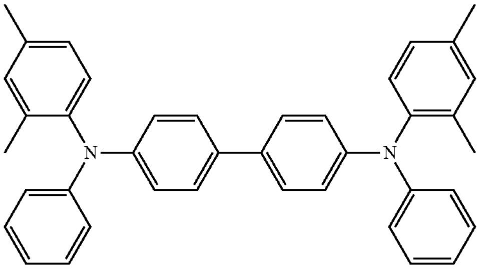
(1-9)
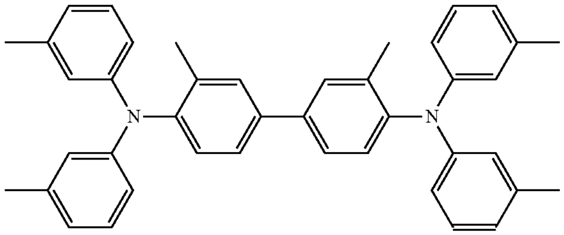
(1-10)
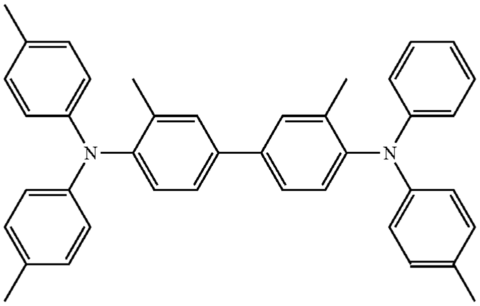
A thermoplastic resin is used as the resin, and examples of the resin can include a polyester resin, a polycarbonate resin, an acrylic resin, and a polystyrene resin. Among them, a polycarbonate resin and a polyester resin are preferred. As the polyester resin, a polyarylate resin is particularly preferred.

A content of the charge transporting substance in the charge transport layer is preferably 25 to 70% by mass, and more preferably 30 to 55% by mass, with respect to a total mass of the charge transport layer.

A content ratio (mass ratio) of the charge transporting substance to the resin is preferably 4:10 to 20:10 and more preferably 5:10 to 12:10.

In addition, the charge transport layer may also contain an additive such as an antioxidant, an ultraviolet absorber, a plasticizer, a leveling agent, a lubricity imparting agent, or an abrasion resistance improver. Specific examples thereof can include a hindered phenol compound, a hindered amine compound, a sulfur compound, a phosphorus compound, a benzophenone compound, a siloxane-modified resin, silicone oil, a fluorine resin particle, a polystyrene resin particle, a polyethylene resin particle, an alumina particle, and a boron nitride particle.

A film thickness of the charge transport layer is preferably 5 to 50 μm, more preferably 8 to 40 μm, and particularly preferably 10 to 30 μm.

(2) Monolayer Type Photosensitive Layer

The monolayer type photosensitive layer can be formed by preparing a coating liquid for a photosensitive layer containing a charge generating substance, a charge transporting substance, a resin, and a solvent, forming a coating film thereof, and drying the coating film. Examples of the charge generating substance, the charge transporting substance, and the resin are similar to those exemplified as the materials for "(1) Laminate type photosensitive layer" mentioned above.

<Protection Layer>

The electrophotographic photosensitive member according to the present invention includes a protection layer as a surface layer. The protection layer contains a binder resin and an inorganic particle as described above. The protection layer is formed as a cured film by polymerizing a compound having a polymerizable functional group in a composition containing the compound having a polymerizable functional group. In this instance, a binder resin contained in the protection layer contains a polymerized product of the compound having a polymerizable functional group.

Examples of the polymerizable functional group included in a monomer having a polymerizable functional group can include an acryloyloxy group and a methacryloyloxy group.

A material having charge transporting ability may be used as the monomer having a polymerizable functional group. As the charge transporting structure, a triarylamine structure is preferred in terms of charge transportation. Examples of the polymerizable functional group included in the material having charge transporting ability can include an acryloyloxy group and a methacryloyloxy group.

The number of polymerizable functional groups included in the monomer having a polymerizable functional group may be one or more. It is particularly preferable that a cured film is formed by polymerizing a composition containing both a compound having a plurality of polymerizable functional groups and a compound having one polymerizable functional group in terms of easily eliminating strain generated in the polymerization of the plurality of polymerizable functional groups.

Examples of the compound having one polymerizable functional group are shown in Formula (2-1) to Formula (2-6).

(2-1)

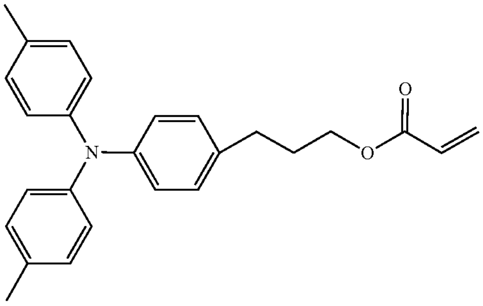

(2-2)

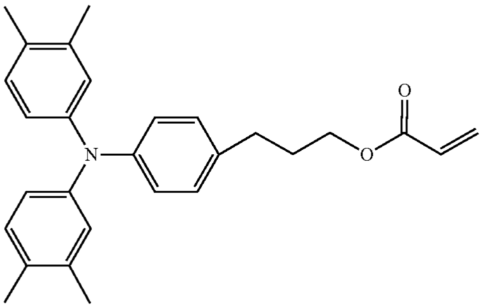

(2-3)

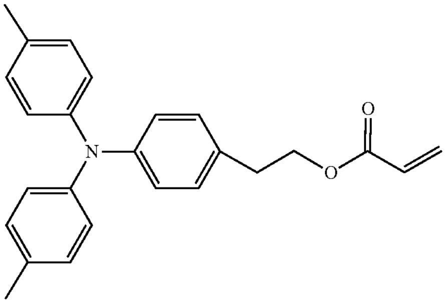

(2-4)

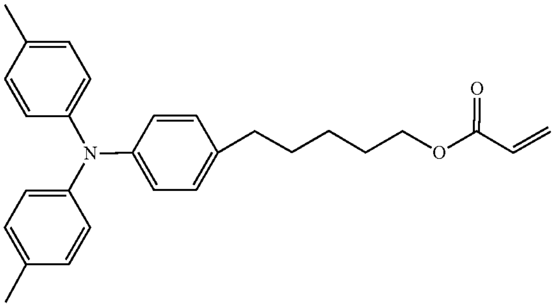

(2-5)

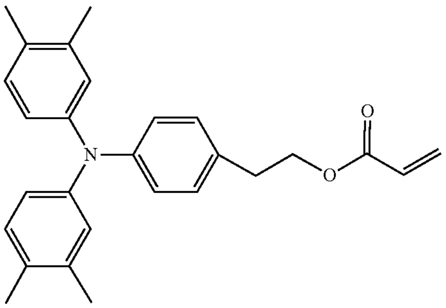

-continued (2-6)

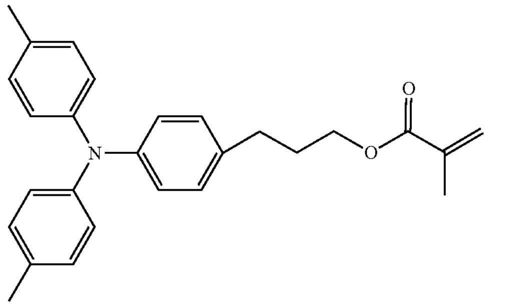

Examples of the compound having a plurality of polymerizable functional groups are shown in Formula (3-1) to Formula (3-7).

(3-1)

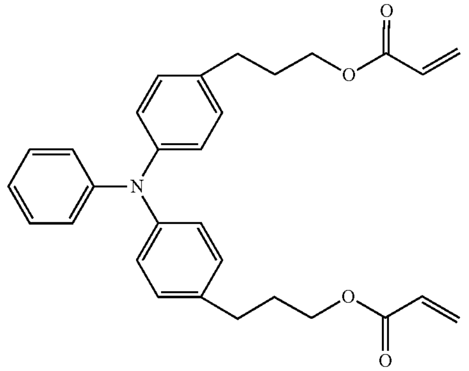

(3-2)

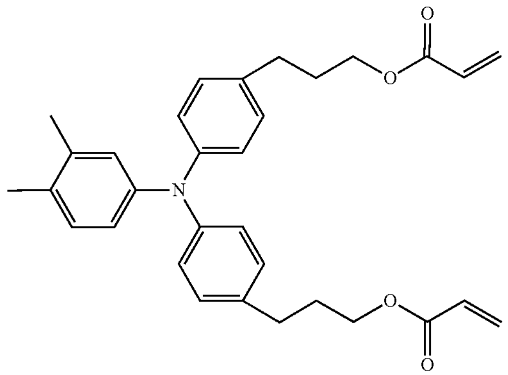

(3-3)

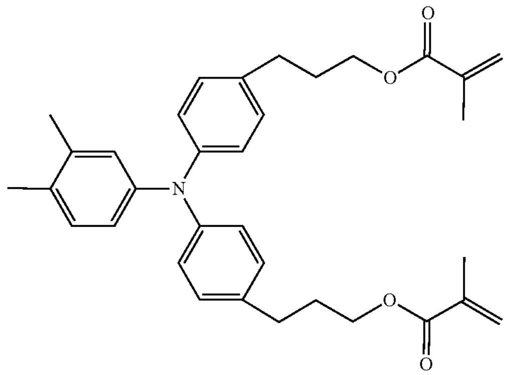

-continued (3-4)

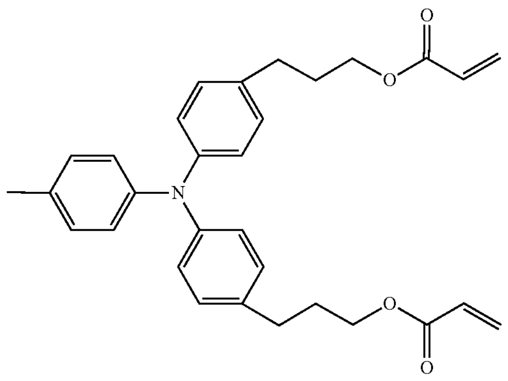

(3-5)

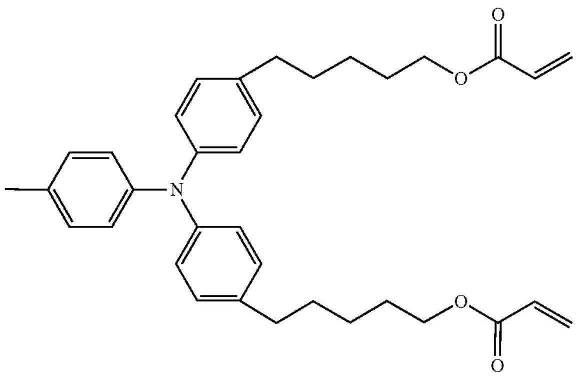

(3-6)

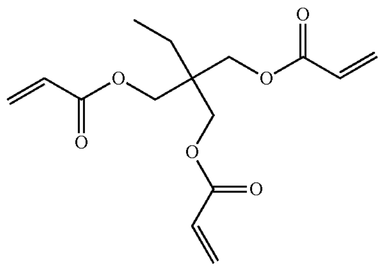

(3-7)

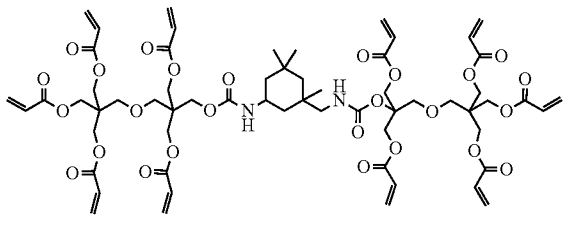

The protection layer preferably further contains electroconductive particles and/or a charge transporting substance, and a resin.

Examples of the electroconductive particle can include particles of metal oxides such as titanium oxide, zinc oxide, tin oxide, and indium oxide.

Examples of the charge transporting substance can include a polycyclic aromatic compound, a heterocyclic compound, a hydrazone compound, a styryl compound, an enamine compound, a benzidine compound, a triarylamine compound, and a resin having a group derived from these substances. Among them, a triarylamine compound and a benzidine compound are preferred.

Examples of the resin can include a polyester resin, an acrylic resin, a phenoxy resin, a polycarbonate resin, a polystyrene resin, a phenol resin, a melamine resin, and an epoxy resin. Among them, a polycarbonate resin, a polyester resin, and an acrylic resin are preferred.

The protection layer may also contain an additive such as an antioxidant, an ultraviolet absorber, a plasticizer, a leveling agent, a lubricity imparting agent, or an abrasion resistance improver. Specific examples thereof can include a hindered phenol compound, a hindered amine compound, a sulfur compound, a phosphorus compound, a benzophenone compound, a siloxane-modified resin, silicone oil, a fluorine resin particle, a polystyrene resin particle, a polyethylene resin particle, a silica particle, an alumina particle, and a boron nitride particle.

A film thickness of the protection layer is preferably 0.2 to 5.0 μm in order to form the concavo-convex shape finely and uniformly. The film thickness of the protection layer is more preferably 0.2 to 4.0 μm and is further preferably 0.2 to 3.0 μm.

The protection layer can be formed by preparing a coating liquid for a protection layer containing the respective materials and a solvent, forming a coating film thereof, and drying and/or curing the coating film. Examples of the solvent used in the coating liquid can include an alcohol-based solvent, a ketone-based solvent, an ether-based solvent, a sulfoxide-based solvent, an ester-based solvent, and an aromatic hydrocarbon-based solvent.

<A Method for Forming the Concavo-Convex Shape on the Outer Surface of the Electrophotographic Photosensitive Member>

Examples of a method for forming the concavo-convex shape on the outer surface of the electrophotographic photosensitive member can include (1) a method in which films having different Young's modulus are laminated and compressed and (2) a method in which a structure is formed by embossing. The method (1) requires a structure in which a relatively hard and thin film contacts with a surface of a relatively soft material closely. In the structure, the surface layer buckles (bends) due to a compressive stress in the direction of the surface. The method (2) is a method in which a pattern is formed by pressing a mold of such as metal to the outer surface, and is widely known as a technique to impart a surface shape to a photosensitive member. Other methods such as laser ablation also can be used.

The method (1) to form the concavo-convex shape is explained in the following.

A protection layer of a cured film formed by polymerizing a cross-linking monomer is formed, in the case of the laminate type photosensitive layer, on a charge transporting layer whose main component is a thermoplastic resin, or in the case of the monolayer type photosensitive layer, on a monolayer type photosensitive layer whose main component is a thermoplastic resin. In this instance, a composition containing a compound having a polymerizable functional group used for forming a protection layer (a coating liquid for a protection layer) contains an inorganic particle. The concavo-convex shape is formed by applying a heat treatment after forming the protection layer.

For a mechanism by which the concavo-convex shape is formed, following is considered. During the heat treatment, a compressive stress is applied due to a difference in the amount deformation between the protection layer and the charge transporting layer or the monolayer type photosensitive layer, causing the protection layer to buckle to form the concavo-convex shape is formed on the outer surface of the photosensitive member. Since the protection layer tend to buckle evenly in the entire surface of the photosensitive member, as illustrated in the examples in FIG. 1A and FIG. 1*i*, the ridgeline of the convex portion of the concavo-convex shape is formed randomly and uniformly in every direction, resulting in the electrophotographic photosensitive member exhibiting the wrinkles.

The heating temperature for forming the concavo-convex shape is preferably set to a temperature exceeding a boiling point of a residual solvent contained in the photosensitive layer. Furthermore, though the heating temperature should be determined based on the boiling point of the solvent used, the heating temperature is more preferably set to 140 to 230° C. When the heating temperature is set to a temperature exceeding a boiling point of a residual solvent, the residual solvent in the photosensitive layer evaporates rapidly, and the points where the residual solvent evaporates tend to become starting points of buckling, and the concavo-convex shape tends to be formed finely and uniformly.

The photosensitive layer is formed by applying a coating liquid for the photosensitive layer to form a coating film for the photosensitive layer, heating the film, and drying the film. The Examples of the solvent of the coating liquid for the photosensitive layer can include an alcohol-based solvent, a ketone-based solvent, an ether-based solvent, an ester-based solvent, and an aromatic hydrocarbon-based solvent. Specifically, the example of the solvent can include toluene, xylene (including at least one selected from the group of o-xylene, m-xylene and p-xylene), methyl benzoate, cyclohexanone, diethylene glycol monoethyl ether acetate, tetrahydrofuran, and dimethoxymethane. Due to that it is easy to leave a moderate amount of the solvent in the photosensitive layer, it is preferable to combine a solvent having a boiling temperature of 140° C. or more and a solvent having a boiling temperature thereof or less.

Known methods can be used for a measurement of an amount of residual solvent and for example, gas chromatography can be used.

The coating liquid for a protection layer contains a compound having chain polymerizable functional group.

The protection layer is formed as a cured film by applying the coating liquid for a protection layer on the photosensitive layer and polymerizing the compound having chain polymerizable functional group.

An example of a reaction for polymerizing a composition containing a monomer having a polymerizable functional group can include a method for polymerizing with heat, light (such as ultraviolet light), or radiation (such as electron beam). Among them, radiation is preferably used and among the radiation, electron beam is more preferably used. In addition, it is necessary to raise a temperature to a certain degree in order to advance the polymerization sufficiently in a short time to form a cured film. Heating is preferably carried out under low oxygen atmosphere in order to polymerize rapidly with preventing inactivation of radical formation. Heating temperature is preferably not higher than a boiling point of a residual solvent in the photosensitive layer and specifically, is preferably 90 to 130° C.

[Process Cartridge and Electrophotographic Apparatus]

A process cartridge according to the present invention integrally supports the electrophotographic photosensitive member described above and at least one unit selected from the group consisting of a charging unit, a developing unit, and a cleaning unit, and is detachably attachable to a main body of an electrophotographic apparatus.

In addition, the electrophotographic apparatus according to the present invention includes the electrophotographic photosensitive member described above, a charging unit, an exposing unit, a developing unit, and a transfer unit.

Figure 5:
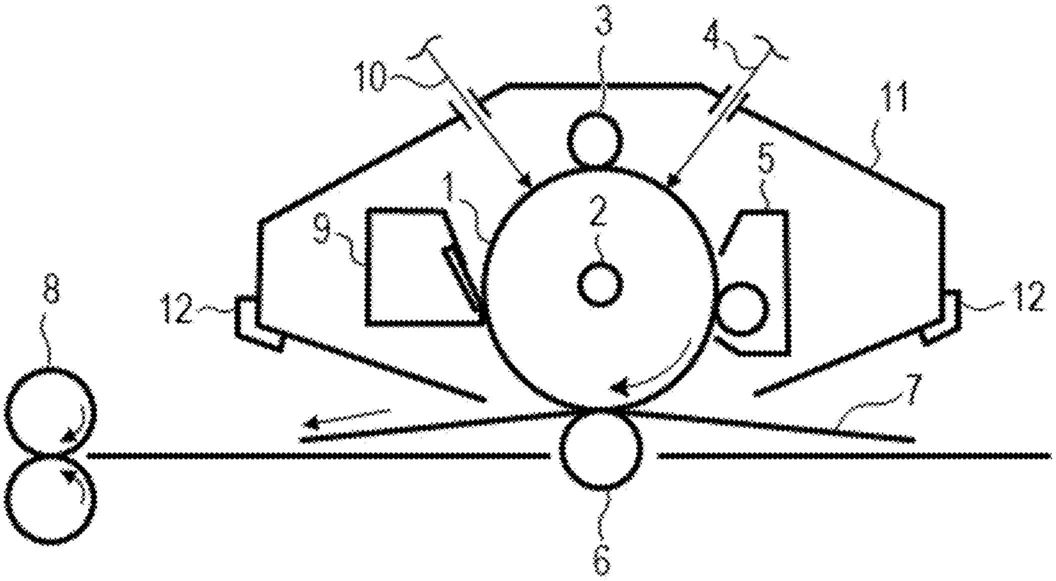
FIG. 5 is a view for illustrating a schematic configuration of an electrophotographic apparatus including a process cartridge provided with the electrophotographic photosensitive member.

An example of a schematic configuration of an electrophotographic apparatus including a process cartridge 11 including an electrophotographic photosensitive member 1 is illustrated in FIG. 5.

A cylindrical electrophotographic photosensitive member 1 is rotatably driven about a shaft 2 in the arrow direction at a predetermined peripheral velocity. A surface of the electrophotographic photosensitive member 1 is charged with a predetermined positive or negative potential by a charging unit 3. Although a roller charging system using the roller type charging unit 3 is illustrated in FIG. 5, a charging system such as a corona charging system, a proximity charging system, or an injection charging system may also be adopted. The surface of the charged electrophotographic photosensitive member 1 is irradiated with exposure light 4 emitted from an exposing unit (not illustrated), and an electrostatic latent image corresponding to target image information is formed on the surface of the electrophotographic photosensitive member 1. The electrostatic latent image formed on the outer surface of the electrophotographic photosensitive member 1 is developed with a toner stored in a developing unit 5, and a toner image is formed on the surface of the electrophotographic photosensitive member 1. The toner image formed on the surface of the electrophotographic photosensitive member 1 is transferred onto a transfer material 7 by a transfer unit 6. The transfer material 7 onto which the toner image is transferred is conveyed to a fixing unit 8 to perform a fixing treatment on the toner image. Thus, the transfer material 7 is printed out the outside of the electrophotographic apparatus. The electrophotographic apparatus may also include a cleaning unit 9 for removing an adhered material such as the toner remaining on the surface of the electrophotographic photosensitive member 1 after the transfer. The electrophotographic apparatus may also include an antistatic mechanism for an antistatic treatment performed on the surface of the electrophotographic photosensitive member 1 by pre-exposure light 10 from a pre-exposing unit (not illustrated). In addition, a guiding unit 12 such as a rail may be provided for detachably attaching the process cartridge 11 to the main body of the electrophotographic apparatus.

The electrophotographic photosensitive member according to the present invention can be used in, for example, a laser beam printer, an LED printer, a copying machine, a facsimile, and a composite machine thereof.

[Evaluation Method for the Concavo-Convex Shape and the Inorganic Particle]

Evaluation methods for the concavo-convex shape which the outer surface of the electrophotographic photosensitive member has and the inorganic particle contained in the surface layer are described in the following.

<An Evaluation Method for the Concavo-Convex Shape on the Outer Surface of the Photosensitive Member and a Measurement Method for the Depth of the Concavo-Convex Shape>

The outer surface of the electrophotographic photosensitive member is magnified and observed with a laser microscope (VK-X200, manufactured by Keyence Corporation) to obtain height information about the irregular shape. Observation regions having square form with one side of 200 μm, including, as their respective central points, 76 points of intersection of 19 line segments dividing the electrophotographic photosensitive member into 20 equal parts in its axis direction and 4 line segments dividing the photosensitive member into 4 equal parts in its circumferential direction are observed. The orientation of each observation region is set to the orientation in which one side of a square is parallel to the circumferential direction of the electrophotographic photosensitive member. The height information is obtained by applying a tilt correction to correct the cylindrical shape of the photosensitive member to a planar shape.

In the next, in the images including the concavo-convex shape obtained by the observation, a reference line L1 that passes through a central point of the observation region and is parallel to a circumferential direction of the electrophotographic photosensitive member is provided. In addition, reference lines L2 to L1,800 obtained by rotating the reference line L1 at every 0.10 around the central point are provided.

Thereafter, with respect to each of the reference lines L1 to L1,800, following is confirmed. Each of the reference lines L1 to L1,800 intersects with a ridgeline of a convex portion of the concavo-convex shape at a plurality of positions, and intersection angles between each of the reference lines L1 to L1,800 and the ridgelines at at least two positions selected from the plurality of positions have different values from each other.

For the measurement of the depth of the concavo-convex shape, a line roughness (JIS B 0601-2001) in the reference line L1 provided in the observation region is analyzed from the height information to determine a maximum valley depth Rv. Arithmetic mean of Rv values determined for respective above mentioned 76 observation regions is defined as the depth of the concavo-convex shape.

<Measurement Methods for a Frequency Rp of the Concavo-Convex Shape on the Outer Surface of the Photosensitive Member and a Variation in Power Values>

A two-dimensional power spectrum $F(r,\theta)$ is obtained by performing frequency analysis of height information of the concavo-convex shape obtained above. Then, a one-dimensional radial direction distribution function $p(r)$ is calculated and a frequency rp at which the $p(r)$ has the maximum value is determined.

In addition, with respect to the frequency rp at which the $p(r)$ has the maximum value, an angular distribution $q(\theta)$ of the two-dimensional power spectrum $F(r,\theta)$ is determined to determine a variation in power values in the entire $\theta$ range.

<A Measurement Method for the Volume-Average Particle Diameter of the Inorganic Particle>

The volume-average particle diameter is measured with Zetasizer Nano-ZS (manufactured by Malvern). The device can measure particle size by dynamic light scattering. First, the inorganic particles to be measured are diluted and adjusted so that the solid-liquid ratio is 0.10% by mass (±0.02% by mass). The dilution is collected in a quartz cell, and placed in a measurement unit. Water or a mixed solvent of methyl ethyl ketone/methanol is used as a dispersing medium. As the measurement conditions, the refractive index of the inorganic particle, the refractive index of the dispersion solvent, the viscosity, and the temperature are input using control software Zetasizer software 6.30 and measured. Dv is adopted as the volume-average particle size.

"Refractive index of solids" described in Handbook of Chemistry, Basic Edition, Revised 5th Edition (edited by The Chemical Society of Japan, Maruzen Co., Ltd.) Vol. II, page 642 is referred to for the refractive index of the inorganic particle. The refractive index of the dispersion solvent, the viscosity, and the temperature are selected from the values contained in the control software. In the case of the mixed solvent, a weight average of the dispersion solvents to be mixed are used.

<A Method to Confirm an Exposing State of the Inorganic Particle at the Concave Portion of the Concavo-Convex Shape and a Measurement Method for the Coverage Ratio>

A total height H corresponding to the height from the highest point to the lowest point of the concavo-convex shape is determined based on the height information of the observation region having square form with one side of 200 μm obtained above. As illustrated in FIG. 3, the portion having a height of half of the total height H or less is defined as the concave portion c of the concavo-convex shape. The concave portion c of the concavo-convex shape is determined for each of the observation regions.

It is determined whether or not the inorganic particle is exposed from the concave portion of the concavo-convex shape in a view from above of the outer surface of the electrophotographic photosensitive member. The coverage ratio is determined by calculating S1/(S1+S2) where a total area of an exposed portion of the inorganic particle at the concave portion is defined as S1, and a total area of the concave portion except for a portion in which the inorganic particle exposes is defined as S2.

For the observation points for confirming the exposing state of the inorganic particle and for measuring the coverage rate, every other point from the end in 19 points in the same axial direction out of the 76 central points of the observation areas (10 places in total) are used. Areas each having square form with one side of 15 μm and including, as their respective central points, the 10 places used, with one side of the square area is parallel to the circumferential direction of the photosensitive member is observed with a scanning electron microscope (SEM) ("S-4800", manufactured by JEOL Ltd.).

In the next, a photographic image of the photosensitive member taken using a scanning electron microscope is captured by a scanner. An image analysis is carried out using an image processing software (Image J (obtained from https://imagej.nih.gov/ij/)) and binarization is applied with respect to the particle in the photographic image. The concave portion of the concavo-convex shape is identified by a laser microscope in advance. A total area of an exposed portion of the inorganic particle at the concave portion is defined as S1, and a total area of the concave portion except for a portion in which the inorganic particle exposes is defined as S2, and then, the coverage ratio S1/(S1+S2) is calculated. The coverage ratios are calculated as described above for the total 10 places and an arithmetic mean of the coverage ratios obtained is defined as the coverage ratio of the inorganic particle at the concave portion of the concavo-convex shape which the outer surface of the photosensitive member has.

According to the present invention, an electrophotographic photosensitive member capable of, in the use under a low temperature and low humidity environment, reducing the friction force with the cleaning blade, exhibiting high cleanability, and having excellent transferability can be provided.

EXAMPLES

The present invention is described in more detail below by way of Examples and Comparative Examples. The present invention is by no means limited to the following Examples, and various modifications may be made without departing from the gist of the present invention. In the description in the following Examples, "part(s)" is by mass unless otherwise specified. The film thickness of each layer of the electrophotographic photosensitive member according to the Examples and the Comparative Examples were determined using an eddy current-type thickness meter (Fischerscope, manufactured by Fischer Instruments K.K.) or converting the mass of the layer per unit area into the thickness thereof through use of the specific gravity thereof.

(Particles)

Particles 1 to 7 used for forming the protection layer (the surface layer) in the Examples and the Comparative Examples are shown in Table 1. Particles 1 to 6 are silica particles (inorganic particle) and Particle 7 is a silicone resin particle. In addition, Particles 4 to 6 are particles of which surfaces have been subjected to a hydrophobization treatment.

TABLE 1

| | Kind of particle (Trade name) | Manufacturer | Volume-average particle diameter (μm) |
|---|---|---|---|
| Particle 1 | KE-P10 | Manufactured by Nippon Shokubai Co., Ltd. | 124 |
| Particle 2 | KE-P30 | Manufactured by Nippon Shokubai Co., Ltd. | 310 |
| Particle 3 | KE-P50 | Manufactured by Nippon Shokubai Co., Ltd. | 550 |
| Particle 4 | QSG-30 | Manufactured by Shin-Etsu Silicone Co., Ltd. | 37 |
| Particle 5 | QSG-80 | Manufactured by Shin-Etsu Silicone Co., Ltd. | 79 |
| Particle 6 | QSG-170 | Manufactured by Shin-Etsu Silicone Co., Ltd. | 192 |
| Particle 7 | TOSPEARL 120 | Manufactured by Momentive Performance Materials Inc. | 3000 |

(Preparation of Surface Treated Particle 1)

Following materials were provided.

10 parts of Methanol 5 parts of Particle 1 (shown in Table 1)

These are mixed and dispersed using ultrasonic homogenizer for 30 minutes under room temperature. Next, 0.25 parts by mass of n-propyltrimethoxysilane ("KBM-3033" manufactured by Shin-Etsu Chemical Co., Ltd.) as a reactive surface treatment agent and 10 parts by mass of toluene were added and mixed for 60 minutes under room temperature. After removing the solvent using evaporator, the product was heated at 140° C. for 60 minutes to prepare Surface treated particle 1 which has been subjected to surface treatment using the reactive surface treatment agent.

(Preparation of Surface Treated Particle 2)

Surface treated particle 2 was prepared in the same manner as in the preparation of the Surface treated particle 1 except for replacing the Particle 1 with Particle 2.

(Preparation of Surface Treated Particle 3)

Surface treated particle 3 was prepared in the same manner as in the preparation of the Surface treated particle 1 except for replacing the Particle 1 with Particle 3.

<Production of Electrophotographic Photosensitive Members>

Example 1

An aluminum cylinder (JIS-A3003, aluminum alloy) having a diameter of 24 mm and a length of 257.5 mm was used as a support (electroconductive support).

Next, following materials were provided.

214 parts of titanium oxide ($TiO_2$) particles (average primary particle diameter of 230 nm) coated with oxygen-deficient tin oxide ($SnO_2$) as metal oxide particles 132 parts of phenol resin (monomer/oligomer of phenol resin) (trade name: Plyophen J-325, resin solid content: 60% by mass, manufactured by DIC Corporation) as binder material 98 parts of 1-methoxy-2-propanol as solvent These materials were placed in a sand mill including 450 parts of glass beads having a diameter of 0.8 mm, and a dispersion treatment was performed under conditions of a rotation speed of 2,000 rpm, a dispersion treatment time of 4.5 hours, and a cooling water setting temperature of 18° C., to obtain a dispersion. The glass beads were removed from the dispersion with a mesh (opening: 150 μm). Silicone resin particles (trade name: TOSPEARL 120, average particle diameter of 2 μm, manufactured by Momentive Performance Materials, Inc.) as a surface roughness-imparting agent were added to the obtained dispersion. An addition amount of the silicone resin particles was set to 10% by mass with respect to a total mass of the metal oxide particles and the binder material in the dispersion after the glass beads were removed. In addition, silicone oil (trade name: SH28PA, manufactured by Dow Corning Toray Co., Ltd.) as a leveling agent was added to the dispersion so that a content of the silicone oil was 0.01% by mass with respect to the total mass of the metal oxide particles and the binder material in the dispersion. Next, a solvent in which methanol and 1-methoxy-2-propanol (mass ratio: 1:1) were mixed with each other was added to the dispersion so that a total mass of the metal oxide particles, the binder material, and the surface roughness-imparting agent in the dispersion (that is, a mass of a solid content) was 67% by mass with respect to a mass of the dispersion. Thereafter, a coating liquid for an electroconductive layer was prepared by stirring the mixture. The coating liquid for an electroconductive layer was applied onto the support by dip coating, and heating was performed at 140° C. for 1 hour, thereby forming an electroconductive layer having a film thickness of 30 μm.

Next, following materials were provided.

4 parts of electron transporting substance represented by following Formula E-1

(E-1)

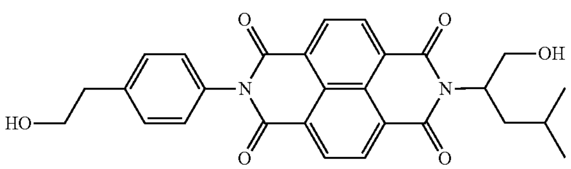

5.5 parts of blocked isocyanate (trade name: Duranate SBN-70D, manufactured by Asahi Kasei Corporation)

0.3 parts of polyvinyl butyral resin (trade name: S-LEC KS-5Z, manufactured by SEKISUI CHEMICAL CO., LTD.)

0.05 parts of zinc (II) hexanoate (manufactured by Mitsuwa Chemical Co., Ltd.) as catalyst These materials were dissolved in a solvent in which 50 parts of tetrahydrofuran and 50 parts of 1-methoxy-2-propanol were mixed with each other, to prepare a coating liquid for an undercoat layer. The coating liquid for an undercoat layer was applied onto the electroconductive layer by dip coating, and heating was performed at 170° C. for 30 minutes, to form an undercoat layer having a film thickness of 0.7 μm.

Next, following materials were provided.

10 parts of crystalline hydroxygallium phthalocyanine having peaks at positions of 7.5° and 28.4° in a chart obtained by CuKα characteristic X-ray diffraction 5 parts of a polyvinyl butyral resin (trade name: S-LEC BX-1, manufactured by SEKISUI CHEMICAL CO., LTD.)

These materials were added to 200 parts of cyclohexanone and dispersed with a sand mill device using glass beads having a diameter of 0.9 mm for 6 hours. 150 parts of cyclohexanone and 350 parts of ethyl acetate were further added thereto to dilute, thereby obtaining a coating liquid for a charge generation layer. The obtained coating liquid was applied onto the undercoat layer by dip coating, and drying was performed at 95° C. for 10 minutes to form a charge generation layer having a film thickness of 0.20 μm.

Measurement of X-ray diffraction was performed under the following conditions.

[Powder X-Ray Diffraction Measurement]

Used measuring machine: X-ray diffractometer RINT-TTRII, manufactured by Rigaku Corporation X-ray tube bulb: Cu Tube voltage: 50 KV Tube current: 300 mA Scanning method: 2θ/θ scan Scanning rate: 4.0°/min Sampling interval: 0.02°

Start angle (2θ): 5.0°

Stop angle (2θ): 40.0°

Attachment: standard sample holder

Filter: not used

Incident monochrome: used

Counter monochromator: not used

Divergence slit: open

Divergence longitudinal restriction slit: 10.00 mm

Scattering slit: open

Light-receiving slit: open

Flat monochromator: used

Counter: scintillation counter

Next, following materials were provided.

5 parts of charge transporting substance (hole transporting substance) represented by the Formula (1-2)

5 parts of charge transporting substance (hole transporting substance) represented by the Formula (1-3)

10 parts of polycarbonate resin (trade name: Iupilon Z400, manufactured by Mitsubishi Engineering-Plastics Corporation)

0.02 parts of polycarbonate resin having copolymerization unit of the following Formulas (C-4) and (C-5) (x/y=0.95/0.05: viscosity-average molecular weight=20,000)

(C-4)

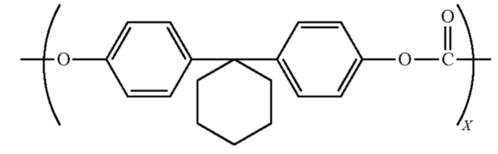

(C-5)

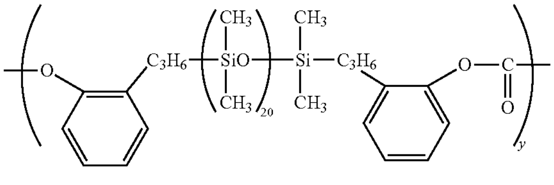

These materials were dissolved in a solvent in which 60 parts of toluene, 20 parts of methyl benzoate, and 20 parts of dimethoxymethane were mixed with each other to prepare a coating liquid for a charge transport layer. The coating liquid for a charge transport layer was applied onto the charge generation layer by dip coating to form a coating film for a charge transporting layer, and the coating film was dried at 120° C. for 30 minutes, thereby forming a charge transport layer having a film thickness of 16 μm.

Next, following materials were provided.

36 parts of the Particle 4

14 parts of the compound represented by the Formula (2-2)

10 parts of the compound represented by the Formula (3-1)

0.1 parts of siloxane-modified acrylic compound (SYMAC US-270, manufactured by Toagosei Co., Ltd.)

These materials were mixed with 58 parts of cyclohexane and 25 parts of 1-propanol and resulting mixture was stirred. As described above, a coating liquid for a protection layer was prepared.

The coating liquid for a protection layer was applied onto the charge transport layer by dip coating to form a coating film for a protection layer, and the obtained coating film was dried at 40° C. for 5 minutes. Thereafter, the coating film was irradiated with electron beams for 1.6 seconds in a nitrogen atmosphere under conditions of an acceleration voltage of 70 kV and a beam current of 5.0 mA while rotating a support (an object to be irradiated) at a speed of 300 rpm. A dose at a position of the outermost surface layer was 15 kGy. Thereafter, first heating was performed by raising the temperature from 25° C. to 100° C. over 20 seconds under a nitrogen atmosphere, thereby forming a cured film having a film thickness of 1.5 μm. An oxygen concentration from electron beam irradiation to a subsequent heat treatment was 10 ppm or less. Next, the coating film was naturally cooled in the atmospheric air until the temperature of the coating film reached 25° C., and then the coating film was subjected to a second heat treatment at 160° C. for 15 minutes to form a protection layer having a concavo-convex shape on a surface thereof, thereby exhibiting wrinkle shapes. As described above, an electrophotographic photosensitive member according to Example 1 was produced.

A concavo-convex shape on an outer surface of an electrophotographic photosensitive member, a depth of a concavo-convex shape, a frequency rp, a variation in power values, presence or absence of an exposing inorganic particle in a concave portion of a concavo-convex shape, and a coverage ratio of an inorganic particle were evaluated by the methods described previously. The results were shown in Table 3.

With respect to the concavo-convex shape, a case where following Condition was satisfied was judged as A, and a case where following Condition was not satisfied was judged as B.

Condition: each of the reference lines L1 to L1,800 intersects with a ridgeline of a convex portion of the concavo-convex shape at a plurality of positions, and intersection angles between each of the reference lines L1 to L1,800 and the ridgelines at at least two positions selected from the plurality of positions have different values from each other.

In addition, with respect to a frequency rp at which p(r) has the maximum value, an angular distribution q(θ) of F(rp,θ) was determined, and then, a case where a variation in power values in the entire θ range is 15% or less was judged as A, and a case where the variation is greater than 15% was judged as B.

In addition, a case where an exposing inorganic particle is present in a concave portion of a concavo-convex shape was judged as A, and a case where an exposing inorganic particle is not present in a concave portion of a concavo-convex shape was judged as B.

Examples 2 to 16

In the formation of the protection layer in the Example 1, kind and amount of each compound used, kind and amount of particle, a film thickness, and a treatment condition of the second heating were changed respectively, as indicated in Table 2. Electrophotographic photosensitive members according to Examples 2 to 16 were produced in the same manner as in the Example 1 except the foregoing. Obtained electrophotographic photosensitive members were subjected to respective measurement and evaluation in the same manner as in the Example 1. The results were shown in Table 3.

TABLE 2

| | Protection layer | | | | | | | |
|---|---|---|---|---|---|---|---|---|
| | Compound having polymerizable functional group | | | | Inorganic particle | | Film | Second |
| | Kind | Part by mass | Kind | Part by mass | Kind | Part by mass | thickness (mm) | heating condtions |
| Example 1 | (2-2) | 14 | (3-1) | 10 | Particle 4 | 36 | 1.5 | 160° C. 15 min |
| Example 2 | (2-2) | 14 | (3-1) | 10 | Particle 5 | 36 | 1.5 | 160° C. 15 min |
| Example 3 | (2-2) | 14 | (3-1) | 10 | Particle 6 | 36 | 1.5 | 160° C. 15 min |
| Example 4 | (2-4) | 10 | (3-4) | 14 | Particle 2 | 108 | 2.0 | 160° C. 15 min |
| Example 5 | (2-2) | 10 | (3-1) | 14 | Surface treated particle 1 | 36 | 2.0 | 160° C. 10 min |
| Example 6 | (2-1) | 10 | (3-4) | 14 | Surface treated particle 1 | 72 | 2.0 | 160° C. 10 min |
| Example 7 | (2-1) | 7 | (3-4) | 17 | Surface treated particle 2 | 72 | 2.0 | 160° C. 10 min |

TABLE 2-continued

| | Protection layer | | | | | | | |
|---|---|---|---|---|---|---|---|---|
| | Compound having polymerizable functional group | | | | Inorganic particle | | Film | Second |
| | Kind | Part by mass | Kind | Part by mass | Kind | Part by mass | thickness (mm) | heating condtions |
| Example 8 | (2-1) | 7 | (3-4) | 17 | Surface treated particle 2 | 96 | 2.0 | 160° C. 10 min |
| Example 9 | (2-1) | 7 | (3-4) | 17 | Surface treated particle 3 | 96 | 2.0 | 160° C. 10 min |
| Example 10 | (2-2) | 7 | (3-1) | 17 | Particle 6 | 72 | 2.0 | 160° C. 10 min |
| Example 11 | (2-1) | 10 | (3-4) | 14 | Surface treated particle 1 | 72 | 2.0 | 160° C. 10 min |
| Example 12 | (2-1) | 10 | (3-4) | 14 | Surface treated particle 1 | 72 | 3.0 | 160° C. 10 min |
| Example 13 | (2-2) | 10 | (3-1) | 14 | Surface treated particle 1 | 29 | 2.0 | 160° C. 10 min |
| Example 14 | (2-2) | 10 | (3-1) | 14 | Surface treated particle 2 | 60 | 3.0 | 160° C. 20 min |
| Example 15 | (2-2) | 10 | (3-1) | 14 | Surface treated particle 2 | 60 | 2.0 | 160° C. 10 min |
| Example 16 | (2-2) | 10 | (3-1) | 14 | Surface treated particle 2 | 67 | 2.0 | 160° C. 10 min |
| Comparative Example 1 | (2-2) | 10 | (3-1) | 14 | Particle 4 | 36 | 2.0 | 100° C. 10 min |
| Comparative Example 2 | (2-2) | 10 | (3-1) | 14 | Particle 4 | 36 | 2.0 | 100° C. 10 min |
| Comparative Example 3 | (2-2) | 10 | (3-1) | 14 | Particle 7 | 29 | 3.5 | 160° C. 20 min |
| Comparative Example 4 | (2-2) | 10 | (3-1) | 14 | — | — | 2.0 | 160° C. 10 min |
| Comparative Example 5 | (2-2) | 10 | (3-1) | 14 | Particle 1 | 19 | 3.0 | 160° C. 10 min |

Comparative Example 1

In the formation of the protection layer in the Example 1, a film thickness and a treatment condition of the second heating were changed as indicated in Table 2. Electrophotographic photosensitive member according to Comparative Example 1 that does not have a concavo-convex shape on the outer surface thereof was produced in the same manner as in the Example 1 except the foregoing. Obtained electrophotographic photosensitive member was subjected to respective measurement and evaluation in the same manner as in the Example 1. The results were shown in Table 3.

Comparative Example 2

Figure 6:
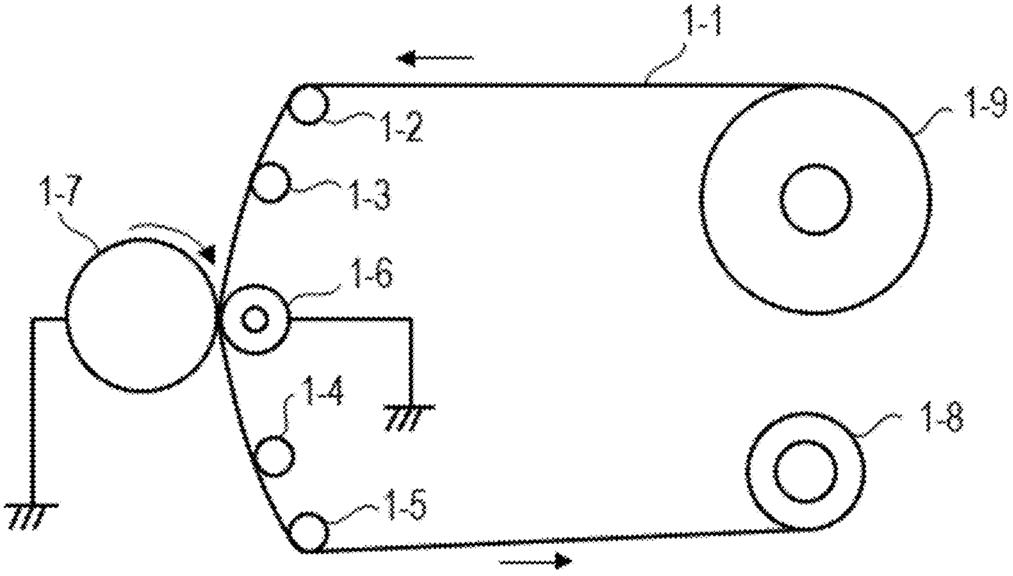
FIG. 6 is a view for illustrating a polisher used for polishing the outer surface of the electrophotographic photosensitive member according to a comparative example.

Electrophotographic photosensitive member according to Comparative Example 2 that does not have a concavo-convex shape on the outer surface thereof was produced in the same manner as in the Comparative Example 1. An outer surface of the electrophotographic photosensitive member was polished using a polisher illustrated in FIG. 6 under the following conditions. Thus, Electrophotographic photosensitive member according to Comparative Example 2 that has a plurality of groove shapes parallel to each other and extending in the circumferential direction on the outer surface of the electrophotographic photosensitive member was produced.

Feeding speed of polishing sheet: 400 mm/min

Rotation speed of electrophotographic photosensitive member: 240 rpm

Polishing abrasive grains: silicon carbide

Average particle diameter of polishing abrasive grains: 3 μm

Polishing time: 20 seconds

A roughening treatment was performed by pressing a polishing sheet 1-1 onto an outer surface of an electrophotographic photosensitive member 1-7 for 20 seconds while feeding the polishing sheet 1-1 to the direction of the arrow and rotating the electrophotographic photosensitive member 1-7 in the direction of the arrow, where the polishing sheet 1-1 is formed by providing a layer which is obtained by dispersing polishing abrasive grains in a binder resin on a sheet-like substrate. Here, 1-2 to 1-5 represent guide rollers, 1-6 represents a back-up roller. 1-8 represents a feeding roller, and 1-9 represents a take-up roller. Obtained electrophotographic photosensitive member was subjected to respective measurement and evaluation in the same manner as in the Example 1. The results were shown in Table 3.

Comparative Examples 3 to 5

In the formation of the protection layer in the Example 1, kind and amount of each compound used, kind and amount of particle, a film thickness, and a treatment condition of the second heating were changed respectively, as indicated in Table 2. Electrophotographic photosensitive members according to Comparative Examples 3 to 5 were produced in the same manner as in the Example 1 except the foregoing. Obtained electrophotographic photosensitive members were subjected to respective measurement and evaluation in the same manner as in the Example 1. The results were shown in Table 3.

TABLE 3

| | Concavo-convex shape | Depth of concavo-convex shape (μm) | Frequency rp ($\mu m^{-1}$) | Variation in power value | Exposing inorganic particle | Hydrophobization treatment to surface of inorganic particle | Volume-average particle diameter of particle (μm) | Coverage ratio |
|---|---|---|---|---|---|---|---|---|
| Example 1 | A | 1.2 | 0.23 | A | A | Treated | 37 | 0.15 |
| Example 2 | A | 1.4 | 0.23 | A | A | Treated | 79 | 0.15 |
| Example 3 | A | 1.4 | 0.24 | A | A | Treated | 192 | 0.15 |
| Example 4 | A | 0.7 | 0.07 | A | A | Not treated | 310 | 0.12 |
| Example 5 | A | 0.7 | 0.13 | A | A | Treated | 124 | 0.15 |
| Example 6 | A | 0.7 | 0.13 | A | A | Treated | 124 | 0.30 |
| Example 7 | A | 0.4 | 0.10 | A | A | Treated | 310 | 0.35 |
| Example 8 | A | 0.4 | 0.10 | A | A | Treated | 310 | 0.60 |
| Example 9 | A | 0.4 | 0.10 | A | A | Treated | 550 | 0.30 |
| Example 10 | A | 0.6 | 0.10 | A | A | Treated | 192 | 0.30 |
| Example 11 | A | 0.7 | 0.17 | A | A | Treated | 124 | 0.30 |
| Example 12 | A | 0.8 | 0.05 | A | A | Treated | 124 | 0.30 |
| Example 13 | A | 1.0 | 0.17 | A | A | Treated | 124 | 0.15 |
| Example 14 | A | 1.5 | 0.04 | A | A | Treated | 310 | 0.20 |
| Example 15 | A | 0.8 | 0.10 | A | A | Treated | 310 | 0.20 |
| Example 16 | A | 0.8 | 0.10 | A | A | Treated | 310 | 0.25 |
| Comparative Example 1 | B | — | — | — | A | Treated | 37 | — |
| Comparative Example 2 | B | — | — | — | A | Treated | 37 | — |
| Comparative Example 3 | A | 1.5 | 0.04 | A | — | — | 3000 | — |
| Comparative Example 4 | A | 0.9 | 0.07 | A | B | Not treated | — | — |
| Comparative Example 5 | A | 0.9 | 0.07 | A | B | Not treated | 124 | — |

<Evaluation>

The following evaluations were performed on the electrophotographic photosensitive members produced in the Examples 1 to 16 and the Comparative Examples 1 to 5.

[Evaluation of Torque]

As an electrophotographic apparatus, a modified apparatus of a laser beam printer (trade name: HIP LaserJet Enterprise Color M553dn, manufactured by Hewlett-Packard Company) was used. Modification points were as follows. The electrophotographic apparatus was modified to allow the amount of drive current of a rotary motor of the electrophotographic photosensitive member to be measured. In addition, the electrophotographic apparatus was modified to allow a voltage applied to a charging roller to be adjusted and measured and the intensity of image exposure light to be adjusted and measured.

The photosensitive members according to each of Examples and Comparative Examples was mounted in a cartridge for a cyan color of the image forming apparatus.

Subsequently, an image of a test chart having a printing ratio of 5% was printed out onto 100 sheets of A4 size plain paper under a low temperature and low humidity condition of 15° C., 10% RH. A charging condition was adjusted so that a dark portion potential was −500 V, and an exposure condition was adjusted so that the amount of image exposure light was 0.25 J/$cm^2$. A drive current value (current value A) when 100 sheets were output was read. The larger the obtained current value, the larger the frictional force between the electrophotographic photosensitive member and the cleaning blade.

In addition, an electrophotographic photosensitive member was produced as in the following. The electrophotographic photosensitive member was produced in the same manner as in the Example 1 except that Particle 4 was not used and the treatment in the second heating step was performed at 100° C. for 10 minutes, thereby not forming a concavo-convex shape. Accordingly, a control electrophotographic photosensitive member that does not have a concavo-convex shape on an outer surface thereof and an inorganic particle is not contained in a surface layer thereof was produced. A drive current value of the rotary motor of the electrophotographic photosensitive member (current value B) was obtained using the control electrophotographic photosensitive member produced in the same manner as in the Example 1.

A ratio of the drive current value (current value A) of the rotary motor of the electrophotographic photosensitive member obtained as described above to the drive current value (current value B) of the rotary motor of the electrophotographic photosensitive member obtained as described above was calculated. The obtained numerical values of (current value A)/(current value B) were compared as relative torque values. The smaller the relative torque value, the smaller the frictional force between the electrophotographic photosensitive member and the cleaning blade.

[Evaluation of Cleanability]

An image having a printing ratio of 5% was printed out onto 500 sheets of A4 size plain paper while placing the modified apparatus under a low temperature and low humidity condition of 15° C., 10% RH. A charging condition was adjusted so that a dark portion potential was −500 V, and an exposure condition was adjusted so that the amount of image exposure light was 0.25 μJ/$cm^2$. Subsequently, an evaluation was performed using a half tone image which was obtained immediately after continuously printing 10 sheets of solid white images and then printing 10 sheets of solid black images. Specifically, streaks in the half tone image caused by passing-through of the toner due to a cleaning failure were visually counted, and the evaluation was performed according to the following criteria.

A: No streaks were observed on the image, and the image quality was good.

B: Very slight streaks were caused.

C: Slight streaks were caused.

D: The streaks were caused on a part of the image.

E: The streaks were caused on the entire image.

The results are shown in Table 4.

[Evaluation of Transferability]

An image having a printing ratio of 5% was printed out onto 500 sheets of A4 size plain paper while placing the modified apparatus under a low temperature and low humidity condition of 15° C., 10% RH. A charging condition was adjusted so that a dark portion potential was −500 V, and an exposure condition was adjusted so that the amount of image exposure light was 0.25 J/$cm^2$. In the evaluation, a solid black image was printed after the printing of 500 sheets and then, a transfer residual toner on the outer surface of the photosensitive member at the forming of the solid black image was stripped off using a clear polyester adhesive tape.

A difference in a density was calculated by subtracting a density of a sample in which only an adhesive tape was pasted on paper from a density of a sample in which the stripped adhesive tape was pasted on paper. Measurement of the density was performed with respect to 5 positions and then, an arithmetic average value of the results on the 5 positions was determined. Thereafter, the transferability was evaluated based on the value of the difference in the density (defined as transfer residual density) according to the following criteria. The density was measured using an X-RITE color reflection densitometer (X-Rite 500 series, manufactured by X-Rite Inc.) was used.

(Evaluation Criteria)

A: The transfer residual density is less than 0.2.

B: The transfer residual density is 0.2 or more and less than 0.5.

C: The transfer residual density is 0.5 or more and less than 1.0.

D: The transfer residual density is 1.0 or more.

The results were shown in Table 4.

TABLE 4

| | Evaluation of Torque | | Evaluation of Transferability | |
|---|---|---|---|---|
| | Relative torque value | Evaluation of Cleanability Cleanability | Transfer-ablity | Transfer residual density |
| Example 1 | 0.77 | B | C | 0.70 |
| Example 2 | 0.75 | B | C | 0.55 |
| Example 3 | 0.76 | B | C | 0.52 |
| Example 4 | 0.70 | A | B | 0.46 |
| Example 5 | 0.68 | A | B | 0.39 |
| Example 6 | 0.68 | A | A | 0.16 |
| Example 7 | 0.69 | A | A | 0.12 |
| Example 8 | 0.69 | A | A | 0.12 |
| Example 9 | 0.69 | A | A | 0.13 |
| Example 10 | 0.70 | A | A | 0.15 |
| Example 11 | 0.71 | A | A | 0.19 |
| Example 12 | 0.68 | A | A | 0.19 |
| Example 13 | 0.70 | A | B | 0.34 |
| Example 14 | 0.78 | B | B | 0.29 |
| Example 15 | 0.70 | A | B | 0.24 |
| Example 16 | 0.70 | A | A | 0.19 |
| Comparative Example 1 | 0.99 | B | B | 0.30 |
| Comparative Example 2 | 0.77 | D | B | 0.35 |
| Comparative Example 3 | 0.72 | B | D | 1.10 |
| Comparative Example 4 | 0.71 | A | D | 1.40 |
| Comparative Example 5 | 0.69 | A | D | 1.40 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-171759, filed Oct. 20, 2021, which is hereby incorporated by reference herein in its entirety.

What is claimed is:

1. An electrophotographic photosensitive member, comprising:

a support;

a photosensitive layer; and a surface layer in this order;

an outer surface of the electrophotographic photosensitive member exhibiting a wrinkled shape by having a concavo-convex shape;

the surface layer comprising a binder resin and an inorganic particle, and at least a part of the inorganic particle is exposed at a concave portion of the concavo-convex shape, wherein when a two-dimensional power spectrum F(r,θ) where r is a frequency component and θ is an angle component is obtained by performing frequency analysis of height information of the concavo-convex shape in the observation region, a one-dimensional radial direction distribution function p(r) obtained by integrating the two-dimensional power spectrum F(r,θ) in a θ direction has at least one maximum value, and when an angular distribution q(θ) is calculated from the two-dimensional power spectrum F(r,θ) at a frequency rp at which the one-dimensional radial direction distribution function p(r) has the maximum value, a variation in power values in the entire θ range is 15% or less, and when an observation region having square form with one side of 200 μm is provided at an arbitrary position on the outer surface, a line that passes through a central point of the observation region and is parallel to a circumferential direction of the electrophotographic photosensitive member is defined as a reference line L1, and 1,799 reference lines obtained by rotating the reference line L1 at every 0.1° around the central point are respectively defined as reference lines L2 to L1,800, (i) each of the reference lines L1 to L1,800 intersects with a ridgeline of a convex portion of the concavo-convex shape at a plurality of positions, and (ii) intersection angles between each of the reference lines L1 to L1,800 and the ridgelines at least two positions selected from the plurality of positions have different values from each other.

2. The electrophotographic photosensitive member according to claim 1, wherein rp is 0.05 to 0.17 $\mu m^{-1}$.

3. The electrophotographic photosensitive member according to claim 1, wherein the concavo-convex shape has a depth of 1.0 μm or less.

4. The electrophotographic photosensitive member according to claim 1, wherein the inorganic particle has a volume-average particle diameter of 50 to 550 nm.

5. The electrophotographic photosensitive member according to claim 1, wherein S1/(S1+S2) is 0.20 to 0.80 when in a view of the outer surface from above, S1 is a total area of exposed portions of the inorganic particle in the concave portion, and S2 is a total area of the concave portion except S1.

6. The electrophotographic photosensitive member according to claim 1, wherein the inorganic particle has a surface which has been hydrophobized.

7. A process cartridge, comprising:

an electrophotographic photosensitive member; and at least one unit selected from the group consisting of a charging unit, a developing unit and a cleaning unit;

the process cartridge integrally supporting the electrophotographic photosensitive member and the at least one unit, and being detachably attachable to a main body of an electrophotographic apparatus;

the electrophotographic photosensitive member comprising a support, a photosensitive layer, and a surface layer in this order;

an outer surface of the electrophotographic photosensitive member exhibiting a wrinkled shape by having a concavo-convex shape;

the surface layer comprising a binder resin and an inorganic particle, and at least a part of the inorganic particle is exposed at a concave portion of the concavo-convex shape, wherein when a two-dimensional power spectrum F(r,θ) where r is a frequency component and θ is an angle component is obtained by performing frequency analysis of height information of the concavo-convex shape in the observation region, a one-dimensional radial direction distribution function p(r) obtained by integrating the two-dimensional power spectrum F(r,θ) in a θ direction has at least one maximum value, and when an angular distribution q(θ) is calculated from the two-dimensional power spectrum F(r,θ) at a frequency rp at which the one-dimensional radial direction distribution function p(r) has the maximum value, a variation in power values in the entire θ range is 15% or less, and when an observation region having square form with one side of 200 μm is provided at an arbitrary position on the outer surface, a line that passes through a central point of the observation region and is parallel to a circumferential direction of the electrophotographic photosensitive member is defined as a reference line L1, and 1,799 reference lines obtained by rotating the reference line L1 at every 0.1° around the central point are respectively defined as reference lines L2 to L1,800, (i) each of the reference lines L1 to L1,800 intersects with a ridgeline of a convex portion of the concavo-convex shape at a plurality of positions, and (ii) intersection angles between each of the reference lines L1 to L1,800 and the ridgelines at least two positions selected from the plurality of positions have different values from each other.

8. An electrophotographic apparatus, comprising:

an electrophotographic photosensitive member;

a charging unit;

an exposing unit;

a developing unit; and a transfer unit;

the electrophotographic photosensitive member comprising a support, a photosensitive layer, and a surface layer in this order;

an outer surface of the electrophotographic photosensitive member exhibiting a wrinkled shape by having a concavo-convex shape;

the surface layer comprising a binder resin and an inorganic particle, and at least a part of the inorganic particle is exposed at a concave portion of the concavo-convex shape, wherein when a two-dimensional power spectrum F(r,θ) where r is a frequency component and θ is an angle component is obtained by performing frequency analysis of height information of the concavo-convex shape in the observation region, a one-dimensional radial direction distribution function p(r) obtained by integrating the two-dimensional power spectrum F(r,θ) in a θ direction has at least one maximum value, and when an angular distribution q(θ) is calculated from the two-dimensional power spectrum F(r,θ) at a frequency rp at which the one-dimensional radial direction distribution function p(r) has the maximum value, a variation in power values in the entire θ range is 15% or less, and when an observation region having square form with one side of 200 μm is provided at an arbitrary position on the outer surface, a line that passes through a central point of the observation region and is parallel to a circumferential direction of the electrophotographic photosensitive member is defined as a reference line L1, and 1,799 reference lines obtained by rotating the reference line L1 at every 0.1° around the central point are respectively defined as reference lines L2 to L1,800, (i) each of the reference lines L1 to L1,800 intersects with a ridgeline of a convex portion of the concavo-convex shape at a plurality of positions, and (ii) intersection angles between each of the reference lines L1 to L1,800 and the ridgelines at least two positions selected from the plurality of positions have different values from each other.

* * * * *